(12) United States Patent
Hogg et al.

(10) Patent No.: US 12,437,321 B2
(45) Date of Patent: *Oct. 7, 2025

(54) SYSTEM AND METHOD FOR LOCATIONAL MESSAGING

(71) Applicant: INTERCEPT LLC, Plano, TX (US)

(72) Inventors: Jason Jude Hogg, St. Petersburg, FL (US); Nicholas Eugene Kleinjan, Edina, MN (US); Nicholas Patrick Johns, Lutz, FL (US); Blaine Anderson, Spring Hill, FL (US); Jamie R. Kenas, St Petersburg, FL (US)

(73) Assignee: Intercept LLC, Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/329,310

(22) Filed: Jun. 5, 2023

(65) Prior Publication Data

US 2024/0152966 A1    May 9, 2024

Related U.S. Application Data

(63) Continuation of application No. 17/090,405, filed on Nov. 5, 2020, now Pat. No. 11,669,865, which is a
(Continued)

(51) Int. Cl.
*G06Q 30/0251* (2023.01)
*G06F 16/9537* (2019.01)
(Continued)

(52) U.S. Cl.
CPC ..... *G06Q 30/0261* (2013.01); *G06F 16/9537* (2019.01); *H04L 51/222* (2022.05);
(Continued)

(58) Field of Classification Search
None
See application file for complete search history.

(56) References Cited

U.S. PATENT DOCUMENTS

| 7,911,335 B1 | 3/2011 | Brady, Jr. |
| 10,575,132 B2 | 2/2020 | Hogg et al. |

(Continued)

FOREIGN PATENT DOCUMENTS

| KR | 10-2010-0073814 | 7/2010 |
| KR | 10-2011-0098120 | 9/2011 |

OTHER PUBLICATIONS

International Search Report and Written Opinion for Application No. PCT/US2012/031439 mailed Oct. 23, 2012.
(Continued)

*Primary Examiner* — Yi Wang
(74) *Attorney, Agent, or Firm* — Merchant & Gould P.C.

(57) ABSTRACT

Positional communication systems and methods include receiving a definition of a first geographic area including a first commercial location by a computer system and storing the first geographic area in a memory. The location of a mobile device in the possession of a customer is determined, and if the mobile device is determined to be at a location within the first geographic area, an incentive message for the customer to leave the location and go to a second commercial location is sent to the mobile device.

5 Claims, 31 Drawing Sheets

Related U.S. Application Data continuation of application No. 15/839,304, filed on Dec. 12, 2017, now Pat. No. 10,832,286, which is a continuation-in-part of application No. 14/011,214, filed on Aug. 27, 2013, now abandoned, which is a continuation-in-part of application No. 13/435,741, filed on Mar. 30, 2012, now abandoned.

(60) Provisional application No. 61/470,961, filed on Apr. 1, 2011.

(51) Int. Cl.
*H04L 51/222* (2022.01)
*H04W 4/021* (2018.01)
*H04W 4/12* (2009.01)
*H04L 12/18* (2006.01)

(52) U.S. Cl.
CPC ............ *H04W 4/021* (2013.01); *H04W 4/12* (2013.01); *H04L 12/1895* (2013.01)

(56) References Cited

U.S. PATENT DOCUMENTS

| | | | |
|---|---|---|---|
| 10,832,286 B2 | 11/2020 | Hogg et al. | |
| 11,669,865 B2 | 6/2023 | Hogg et al. | |
| 2005/0261826 A1 | 11/2005 | Kurosawa et al. | |
| 2006/0085419 A1* | 4/2006 | Rosen | G06Q 30/0267 707/999.009 |
| 2007/0073717 A1 | 3/2007 | Ramer et al. | |
| 2007/0083408 A1* | 4/2007 | Altberg | G06Q 30/02 705/14.69 |
| 2007/0127702 A1* | 6/2007 | Shaffer | G06Q 10/10 379/355.04 |
| 2008/0045234 A1 | 2/2008 | Reed | |
| 2008/0133336 A1* | 6/2008 | Altman | H04W 4/21 705/14.1 |
| 2009/0143065 A1* | 6/2009 | Mattila | H04L 41/12 370/328 |
| 2009/0197582 A1 | 8/2009 | Lewis et al. | |
| 2010/0075638 A1 | 3/2010 | Carlson et al. | |
| 2010/0216491 A1 | 8/2010 | Winkler et al. | |
| 2010/0228469 A1 | 9/2010 | Varadarajan | |
| 2010/0291907 A1 | 11/2010 | MacNaughtan et al. | |
| 2010/0317370 A1 | 12/2010 | Feng et al. | |
| 2011/0059759 A1 | 3/2011 | Ban | |
| 2011/0128234 A1 | 6/2011 | Lipman et al. | |
| 2011/0141276 A1 | 6/2011 | Borghei | |
| 2011/0163874 A1 | 7/2011 | van Os | |
| 2011/0199254 A1 | 8/2011 | Bishop et al. | |
| 2011/0238762 A1 | 9/2011 | Soni et al. | |
| 2012/0047129 A1* | 2/2012 | Redstone | G06Q 10/10 707/723 |
| 2012/0115506 A1 | 5/2012 | Bentley | |
| 2012/0136873 A1 | 5/2012 | Shaffer et al. | |
| 2012/0142383 A1 | 6/2012 | Velusamy et al. | |
| 2012/0208564 A1 | 8/2012 | Clark et al. | |
| 2012/0296565 A1 | 11/2012 | Liu | |
| 2013/0027429 A1 | 1/2013 | Hogg et al. | |
| 2013/0042180 A1* | 2/2013 | Sai | G09B 21/008 715/729 |
| 2013/0346205 A1 | 12/2013 | Hogg et al. | |

OTHER PUBLICATIONS

International Search Report and Written Opinion for Application No. PCT/US2014/052964 mailed Dec. 8, 2014.

\* cited by examiner

SYSTEM AND METHOD FOR LOCATIONAL MESSAGING

RELATED APPLICATIONS

This application is a continuation of application Ser. No. 17/090,405, filed Nov. 5, 2020, which is a continuation of application Ser. No. 15/839,304, filed Dec. 12, 2017, which is a continuation of application Ser. No. 14/011,214, filed Aug. 27, 2013, now abandoned, which is a continuation-in-part of application Ser. No. 13/435,741, filed Mar. 30, 2012, now abandoned, which application claims the benefit of provisional application Ser. No. 61/470,961, filed Apr. 1, 2011, which applications are incorporated herein by reference in their entireties.

TECHNICAL FIELD

The present document relates generally to a system and method for delivery of digital content based upon the location of a particular recipient, and more particularly to a system and method for delivering a message to a mobile device, such as a cellular telephone, based upon the location of the mobile device.

BACKGROUND

Traditionally, the delivery of digital content (message forum postings, email, text messages, SMS, video files, graphics files, audio files, etc.) is organized around a universal resource locator (URL), telephone number or email address. In other words, when considering the question of to where content is delivered, the answer is that content is delivered to a particular URL (example: content is uploaded to a particular image file server, such as the image file server at flickr.com, or to a particular video server, such as the one available at youtube.com, or to a particular forum server, such as the one available at 4chan.org), to a particular telephone number (example: a text message or SMS is delivered to a particular telephone number), or to a particular email address (content associated with emails are delivered to a particular email address). One result of this present state of affairs is that content which is intended for receipt by a community is generally accessed by the community via a website. Thus, the community is nucleated about a website. Discussion pertaining to a restaurant, for example, is nucleated about a website such as chowhound.com, as opposed to being nucleated around the particular restaurant that is the subject of the discussion. One disadvantage of this organization is that although a given individual may be a customer of the aforementioned restaurant, that individual will not encounter the content pertaining to the restaurant if he does not visit the particular website that hosts the content.

There exists a need for a service that organizes the delivery of electronic content around physical location as at least one aspect of its content delivery scheme.

SUMMARY

Against this backdrop, the disclosed systems and methods were developed. In accordance with certain aspects of the disclosure, a computerized method of providing a customer incentive to leave a first commercial location and to arrive at a second commercial location includes receiving a definition of a first geographic area including the first commercial location by a computer system and storing the first geographic area in a memory. A location of a mobile device in the possession of the customer is determined, and if the mobile device is determined to be at a location within the first geographic area, then an incentive message for the customer to leave the location and go to the second commercial location is sent to the mobile device.

In accordance with further aspects of the disclosure a system includes a back-end including a server and a memory, and a front-end including a mobile device application. A communications interface is accessible by the back-end and the front-end. The back-end is configured to determine a location of a mobile device including the mobile device application, and if the mobile device is determined to be at a location within a first geographic area, then an incentive message for a customer to leave the location and go to a second commercial location is sent to the mobile device.

Other aspects of the disclosure include an application for a mobile device that implements a method including determining a location of the mobile device running the application. If the mobile device is determined to be at a location within a first geographic area, then a notification is sent to a back-end. An incentive message for a customer to leave the location and go to a second commercial location is received by the application, and the incentive message is displayed on the mobile device.

DETAILED DESCRIPTION

Figure 1:
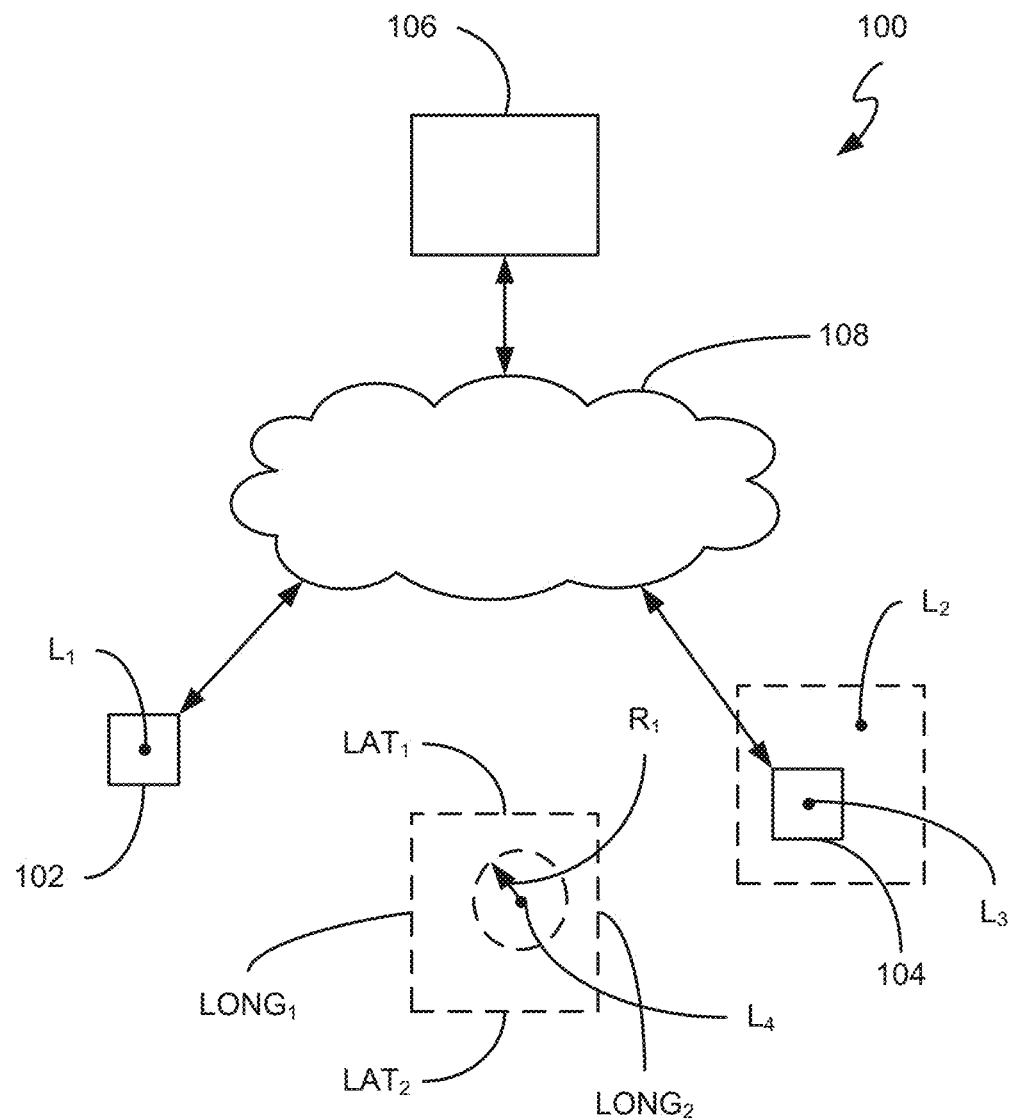
FIG. 1 depicts a locational messaging system, in accordance with some embodiments of the invention.

FIG. 1 depicts one embodiment of a locational messaging system. As can be seen from FIG. 1, the system 100 includes a plurality of mobile communication and processing devices 102 and 104. Although FIG. 1 depicts a system including two mobile communication and processing devices 102 and 104, the locational messaging system 100 may include any number of such devices 102 and 104, including very large numbers of such devices 102 and 104, such as millions of such devices 102 and 104, or more. According to one embodiment, the mobile communication and processing devices 102 and 104 are embodied as smart phones, such as an iPhone® or a phone running the Android® operating system. According to another embodiment, the mobile devices 102 and 104 are embodied as personal display assistant devices, tablet devices, mobile gaming devices, or any other mobile device understood by those of skill in the art to provide a mobile execution environment with certain positional detection capabilities and communication capabilities, which are discussed in greater detail herein.

According to one embodiment, each mobile device 102 and 104 may communicate with a positional content platform 106 via a communication network 108, such as the Internet.

An application executing on the mobile device 102 or 106 permits its user to generate digital content and to associate that digital content with a location, so that the content can be encountered by another user of such a mobile device 102 or 104. For example, a user of mobile device 102 creates a simple unit of digital content, a textual message, reading "I was here," and associates the message with a location. The user of mobile device 102 may elect to associate the aforementioned message with his present location L1. According to one embodiment, the mobile device 102 detects its current location and associates the content generated by the user with the current location. On the other hand, the user may elect to associate his message with a location that is different from his current location, such as at location L2. In either event, in the wake of generating the content, the content and desired location for association with the content is communicated to the positional content platform 106.

Continuing with this example, the user of mobile device 104 uses the mobile device 104 to discover and view the content. According to one embodiment, the mobile device 104 presents a user interface having a field of view that corresponds with a region R1. According to one embodiment, the mobile device 104 detects its current location, and based upon its current location defines its field of view to be generally centered about or to otherwise contain its location. As can be seen in FIG. 1, the mobile device 104 is located at location L3 and therefore presents a field of view corresponding to region R1, which encompasses location L3. An icon corresponding to the content associated with location L2 is presented within the field of view, at a location within the field of view corresponding to location L2. Therefore, when located at location L3, the user of the mobile device 104 observes, via the field of view presented by the user interface, an icon alerting him to the presence of content associated with location L2. The user may select the icon, and view the message: "I was here." According to some embodiments, the field of view may encompass an area that does not contain the present location of the mobile device 104, and the field of view may be selectable by the user of the mobile device 104.

According to some embodiments, the mobile device 104 sends a service call to the positional content platform 106 to obtain information concerning the location of content, so that icons may be properly presented within the aforementioned field of view. According to some embodiments, the mobile device directs a service to the positional content platform 106; the service call includes parameters defining the region corresponding to the field of view. The positional content platform 106 responds by returning a data set that identifies each unit of content within the aforementioned region and the location associated with each such unit. This request and response transaction provides the mobile device 104 with sufficient information to generate the field of view and to place icons appropriately within the field of view, so that the location of the icons within the field of view correspond to the physical location of the messages within the physical region corresponding to the field of view.

In response to having encountered and viewed the content associated with location L2, the user of mobile device 104 may generate a response, such as, "So was I." According to some embodiments, the response is associated with the original message, so that the original message and content form a thread or discussion thread that is associated with location L2. The thread—also a form of content—is discoverable and viewable in the manner described above. Digital content to be associated with a location may take on any form, including, without limitation, the form of a textual message, a graphical image, such as a graphics file generated by the mobile device 104 via an integrated camera, a video file, such as a video file generated by the mobile device 104 via an integrated camera, such as an audio file generated by the mobile device 104 via an integrated microphone, digital content for game, digital content representing a discount or savings to be redeemed at a merchant, digital content representing a monetary value, a computer file, such as an executable program or data file, or any other form of digital content.

According to some embodiments some content may be of more interest than other content. For example, the user of mobile device 104 may have more interest in content generated by certain users, such those he knows, than by other users, such as those he does not know. The user may also have more interest in content that has been recently generated or changed than he does in content that has been generated in the more distant past. Similarly, the user may have more interest in content that he has not viewed than in content he has already viewed. According to some embodiments, to assist the user in discovering content suited to his preferences, the mobile device permits the user to establish or select filters that influence whether a given unit of content will be represented as an icon within the field of view presented to the user. According to some embodiments, the mobile device directs a service call to the positional content platform 106; the service call includes parameters defining the region corresponding to the field of view, and further includes filter data (examples: date of creation of content later than a specified date, creator of content must be found within a list established by the user, content not previously viewed, etc.). The positional content platform 106 responds by returning a data set that identifies each unit of content that both satisfies the filter requirements and is located within the aforementioned region. The location associated with each such unit of content is also returned. This request and response transaction provides the mobile device 104 with sufficient information to generate the field of view and to place icons appropriately within the field of view, so that the icons actually presented in the field of view correspond to content satisfying the filter requirements.

According to some embodiments, the system 100 includes a registration process. The registration process requires a user to establish a user name and a password, so that the user can later log into his account. The system also affords the user the opportunity to create an association between his own account and other users of the system 100. For example, the system 100 permits the user to assign a "friend" or "follower" or other relationship between his account and another user's account. According to some embodiments, these relationships may be imported from other platforms (example: "friends" may be imported from Facebook®, and "followers" from Twitter®, etc.). According to some embodiments, these relationships may be used as filter criteria, so that only certain content ultimately ends up being represented as an icon on a user's field of view.

According to some embodiments, the system 100 presents an interface by which the user may define a region as a "place," and may assign a name to the place. For example, the mobile device 104 may present its user with an interface allowing the user to define a place as the region determined by the latitude and longitude of a given location L4, and a radius R1 extending from the location L4. According to some embodiments, the radius R1 may extend in two dimensions, while according to other embodiments, the radius R1 may extend in three dimensions. According to some embodiments, the mobile device 104 presents its user with an interface by which its user may define a pair of latitudinal coordinates LAT1 and LAT2 and a pair of longitudinal coordinates LONG1 and LONG2, thereby defining a place as the interior region defined by the pairs of latitudinal coordinates LAT1 and LAT2 and longitudinal coordinates LONG1 and LONG2. According to some embodiments, the mobile device 104 presents its user with an interface by which its user may further specify altitude data, thereby defining a "place" as referring to a region defined as described above, at a particular altitude.

The system 100 allows a place or set of places to be associated with a use, so that the user can interact with a selected place in different manners. For example, one or more places can serve as filter criteria: represent as icons only those units of digital content associated within the region corresponding to a place prescribed by the user. Other uses of places, some of which are described herein, are also possible.

According to some embodiments, the system 100 provides notifications of the occurrence of certain events to the user. By way of example, and without limitation, a notification may take the form of a tone or audio indication from the mobile device 102 or 104, a vibration from the mobile device 102 or 104, delivery of a notification to a "notification center" of the mobile platform 102 or 104, presentation of a message on the device's Lock Screen, presentation of a banner (optionally with a message or number therein) superimposed over a button or icon, or presentation of a badge superimposed upon a button or icon. According to some embodiments, and by way of example, and without limitation, a mobile device 102 or 104 may provide its user with a notification in the event that: content was newly associated with a location in a defined "place"; that content was newly associated with a location within the field of view of the user interface; that another user designated as a "friend" or "followed by" (or bearing some other relationship to the user's account) has entered a location within a defined "place"; that another user designated as a "friend" or "followed by" (or bearing some other relationship to the user's account) has entered the field of view of the user interface; that content has been created by another user designated as a "friend" or "followed by" (or bearing some other relationship to the user's account); that another user has responded to a unit of content that the user has created, such as by "replying" in a thread. These notification are delivered asynchronously, being provided to the mobile device from the positional content platform 106 (in some instances via an intermediary service offering "push" notification services), with the timing of the presentation of any particular notification being a function of when the triggering event occurred, and with the manner of presentation of the notification being a function of the configuration of the mobile device 102 or 104 and the state of execution of the application (example: the application is in the foreground, the application is in the background, the application is inactive, the device is asleep, etc.).

According to some embodiments, the system provides "newsfeeds" to the user of the mobile device 102 or 104. In some embodiments, a newsfeed is a chronological queue of activity within the system 100 bearing characteristics that the action may be of interest to the user. The user interface provides a screen that allows the user of the mobile device 102 or 104 to view the newsfeed. According to some embodiments, events included in the newsfeed include those events that would trigger a notification. The occurrences of other events also are included in the news feed, such as the number of responses in a thread surpassing a threshold, a "friend" registering as a user of the system 100, another user followed by the user or who follows the user registering as a user of the system 100, etc.

According to some embodiments, the system 100 may access a public application interface exposed by a social network or other external platform, in order to create a message (such as a "wall" posting, tweet, etc.) informing users of those platforms that a unit of content was generated within the system 100. Optionally, the aforementioned message may include a hyperlink, permitting its viewer to select the link to view a webpage. The webpage referenced by the hyperlink may allow the visitor to register for the service, or in the event that the visitor is already registered, to log into his account, to view the content, or to interact with the content (example: to respond to the content, as may be the case in the context of a thread).

According to some embodiments, the platform 106 is programmed with a set of rules for conducting a game, the play of which is conducted at least partially through the encountering at a geographic location or region, viewing from or at a geographic location or region, placing at a geographic location or region or configuration of digital content to be placed at a geographic location or region. The platform 106 further includes rules and interfaces to permit encountering the game content, user reaction to such encounters, and manipulation of state variables defining a game's state in reaction to such encounters. The platform 106 further includes rules and interfaces to permit viewing of the game content, user reaction to such viewing, and manipulation of state variables defining a game's state in reaction to such viewing. The platform 106 further includes rules and interfaces to permit placing the game content in association with a geographic location, user reaction to such placements, and manipulation of state variables defining a game's state in reaction to such placements. The platform 106 further includes rules and interfaces to permit configuring the game content, user reaction to such configuration, and manipulation of state variables defining a game's state in reaction to such configuration.

Figure 2:
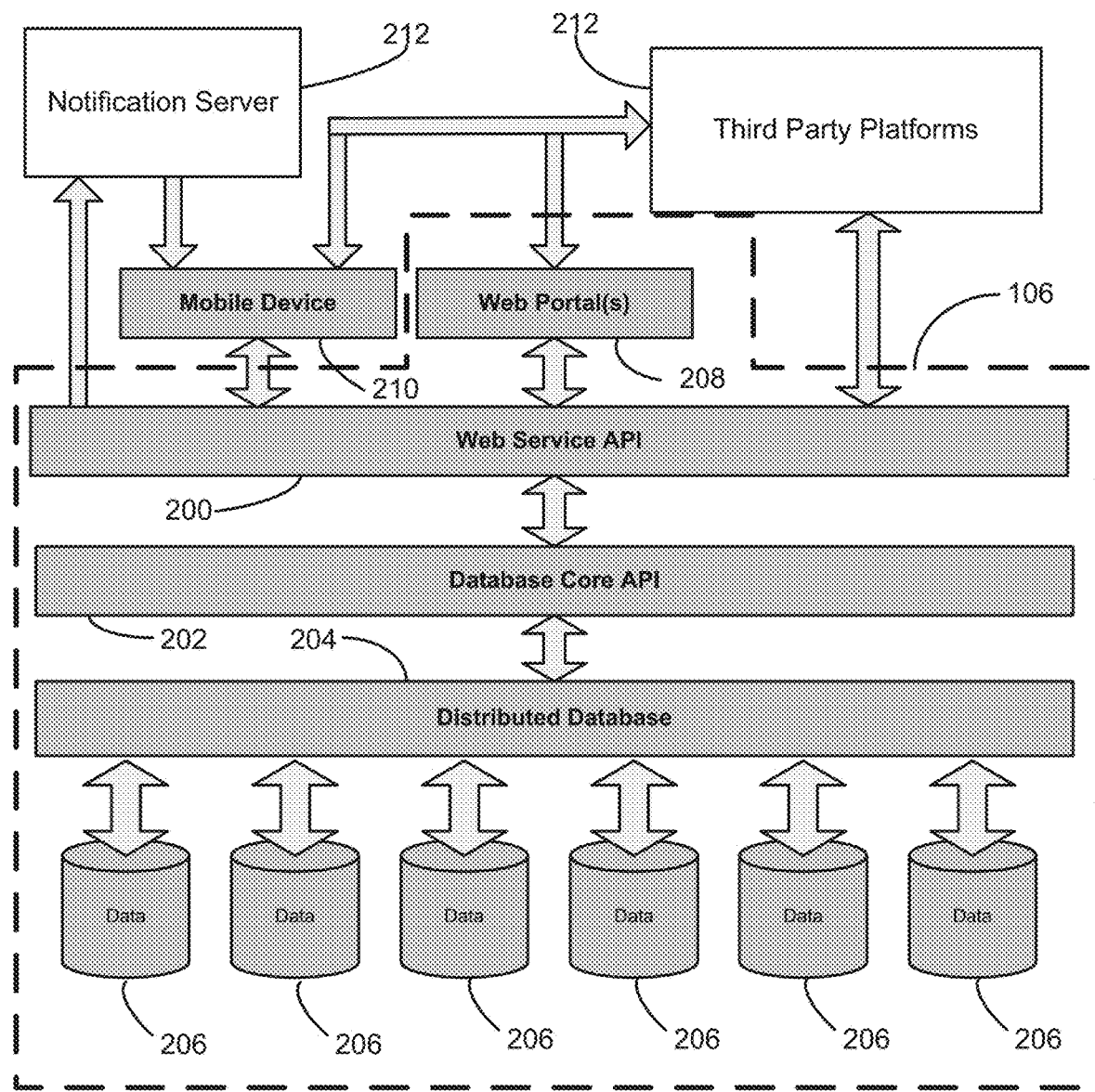
FIG. 2 depicts a logical architecture of the positional content platform, in accordance with some embodiments of the invention.

FIG. 2 depicts a logical architecture of the positional content platform 106, according to some embodiments. As can be seen from FIG. 2, the positional content platform includes a service layer 200, a core database application interface (API) 202, a logical data layer 204, a physical data layer 206, and a web portal 208. Also depicted in FIG. 2 is an application 210 executing on the mobile platform 102 and 104, which is referred to herein as the positional content application 210.

The positional content application 210 communicates with an API exposed via the web services layer 200. The service layer 200 exposes API's to the positional content application 210, permitting the positional content application to cooperate with the positional content application to perform the operations and provide the features disclosed herein. For example, the web services layer may expose API's allowing creation of content and association of the content with a location, allowing retrieval of content, allowing retrieval of attribute content within a field of view, allowing logging in or out of an account, etc.

Data constituting the positional digital content is stored in the physical data layer 206, as is user account data and other data needed for performance of the operations and features disclosed herein. The service layer 200 interacts with the data stored in the physical data layer 206 through the core API's 202 exposed by the database server, and through stored procedures, schemas, and other tools pertaining to the logical organization of the database 204.

According to some embodiments, the database 202, 204 and 206 is a relational database, while in other embodiments it is embodied as an object oriented database, or as a graph database. Optionally, the physical storage layer 206 may be distributed, and may optionally be arranged so that data from users in a particular geographic region is dedicated to a particular storage array, or may be optionally arranged so that content associated with a given geographic region is stored in one array, while content associated with another geographic region is stored in a different array.

By way of illustration, the positional content application 210 can make a service call to the service layer 200 to obtain information needed to position icons representative of data within the field of view prevailing in its user interface, as has been discussed with reference to FIG. 1. The service call contains data from which the geographical range corresponding to the field of view can be determined, and may optionally contain filter data. The service layer 200 responds by interpreting the service call, and breaking it into a series of core API calls to the core database API layer 202, causing the API layer 202 to interact with the physical data storage layer to retrieve the requested data. The requested data is then passed to the service layer, which packages the data in a way appropriate for transport to and ingestion by the positional content application 210. Finally, the positional content application 210 responds by unpacking the returned data and positioning icons on the field of view, pursuant to the data returned by the service layer 200.

According to some embodiments, the service layer 200 also interacts with third party platforms in order to perform the operations and provide the features disclosed herein. For example, the service layer 200 optionally interacts with social platforms 212 to ingest user account data, such as friend lists, follower lists, and to post messages on those platforms. Similarly, the positional content application also optionally interacts with third party platforms, for reasons ranging from obtaining map or satellite imagery (discussed in more detail herein), for interaction with an authorization engine, such as an o-auth engine, and for other reasons required for the performance of operations and provision of features disclosed herein.

According to some embodiments, the service layer 200 interacts with a notification service 212. The notification service 212 is an external platform exposes an API that provides clients the ability to asynchronously communicate data messages to the mobile devices 202 and 204. The notification service 212 interacts with the operating system on the mobile device 202 and 204, in lieu of the service layer 200 directly performing such an interaction, in order to control the flow of notification calls directed to any given mobile device 202 or 204. The service layer 200 call the notification service 212 in order to provide the notification functionality discussed above and in greater detail below.

It will be understood by one skilled in the art that the execution environment for the positional content platform may be embodied as a single platform. Optionally, each of the elements of the positional content platform may be executed on separate servers, and any number of the elements may be executed on a single server or distributed across any number of servers. Optionally, the servers may operate as a cluster to permit greater availability and faster response times, as is well understood in the art.

Figure 3:
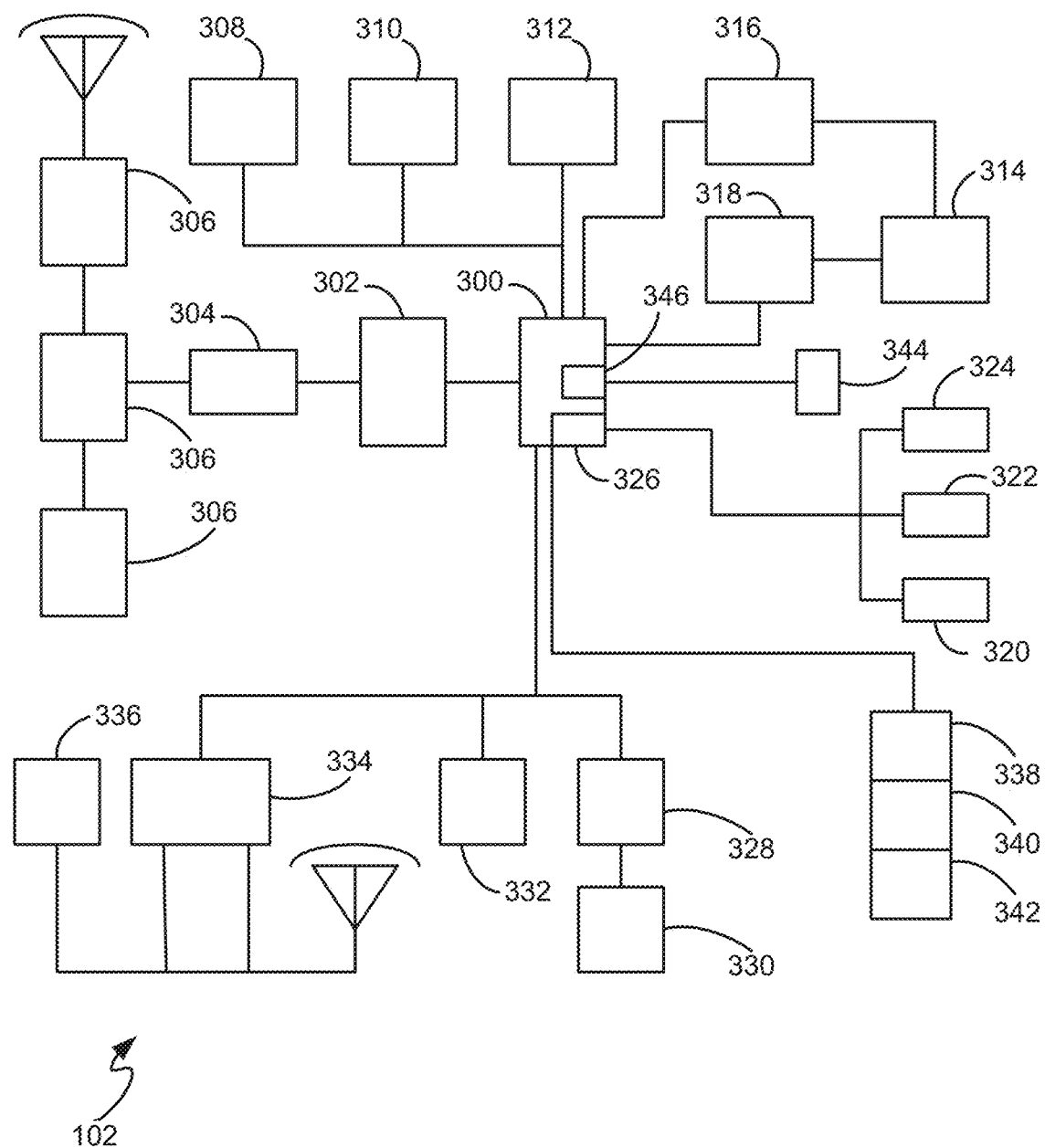
FIG. 3 depicts an exemplary embodiment of a mobile device, in accordance with some embodiments of the invention.

FIG. 3 depicts an exemplary embodiment of a mobile device 102 or 104, according to some embodiments. As can be seen from FIG. 3, the mobile device 102 include an applications processor 300 and a baseband processor 302. Application processor 300 communicates information to baseband processor 302, so that the baseband processor 302 can prepare the data, which may constitute voice data, or may constitute wireless mobile internet data, for encoding, modulation and transmission via the transceiver 304 and power amplifiers 306. During operation, the processors 300 and 302 have use of a multilevel cell memory 308, a static RAM 310 and a synchronous dynamic RAM 312 for the storage and retrieval of executable code and data.

The mobile device 102 is provided with power through the cooperative efforts of an optionally rechargeable battery 314, and two power management modules 316 and 318, which serve to monitor the voltage of the battery 314, regulate voltage levels, activate and deactivate subcircuits and input/output devices and other elements to conserve power, and perform other power management functions that are well known in the art.

The mobile device 102 also includes microphone 320, speaker 322, and earpiece 324, which are coupled to the application processor 300 via an encoder/decoder module 326. The microphone 320, speaker 322 and earpiece 324 are input/output devices used to perform various operations and provide various aspects of features (such as enable various aspects of content creation and content delivery) of the system 100 disclosed herein.

The application processor 300 is also coupled to a touch screen controller 328, which controls the operation of a touch screen 330, which is the primary means of visual input/output capability of the mobile device 102.

The mobile device 102 also optionally includes a camera 332 coupled to the application processor, for capture of video imagery, which the processor stores as graphics files or video files, in formats well understood by those of skill in the art.

Also coupled to the application processor 300 is a Wi-Fi and Bluetooth transceiver 334, which optionally functions in accord with I.E.E.E. 802.11a/b/g standards, Bluetooth 2.1 +EDR and FM. The Wi-Fi and Bluetooth transceiver 334 cooperates with the application processor 300 to provide Wi-Fi connection to a communication network, such as the Internet.

The mobile device 102 includes a global positioning system (GPS) transceiver 336 which provides positional data to the application processor, so that the operating system of the device 102 can provide location services, such as providing latitudinal, longitudinal and accuracy data to application executing on the mobile platform 102.

The mobile device 102 also optionally includes a magnetic sensor 338, which senses the magnetic polarity of the earth, and provides directional information to the processor 300. Also, the mobile device 102 optionally includes an accelerometer 340 for detecting forces acting upon the accelerometer 340, such as forces originating from acceleration of the mobile device 102 or from gravity or the like. The accelerometer provides its data to the processor 300. The mobile device 102 also optionally includes a gyroscope 342 that detects rotation of the mobile device 102 about its three axes, and provides the rotational information to the processor 300. The mobile device 102 may also include a serial port 344 that is coupled to the processor 300 via a serial port controller 346, for the communication of serial data to and from the processor 300, for the delivery of direct current power to the device 102 and for other functions known to those of skill in the art.

Figure 4:
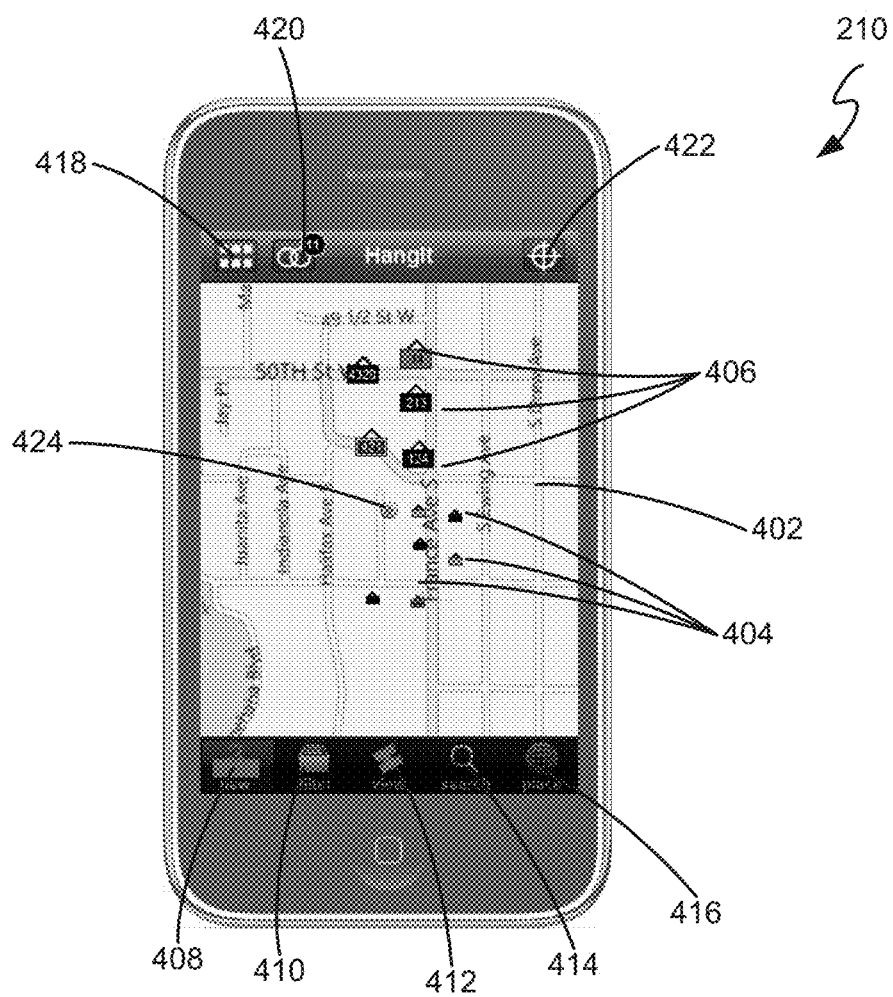
FIG. 4 depicts a user interface presented by the positional content application, in accordance with some embodiments of the invention.

FIG. 4 depicts a user interface 400 presented by the positional content application 210, according to some embodiments. In the depiction of FIG. 4, user interface 400 presents a screen that may be used for locating content stored on the positional content platform 106. Given the particular active screen in FIG. 4, the user interface 400 includes a field of view 402. The field of view 402 corresponds to a region of geography on earth. In the particular embodiment depicted in FIG. 4, a map is depicted within the field of view to help 402 the user determine the particular region to which the field of view 402 corresponds, although this need not be the case.

As can be seen from FIG. 4, content icons 404 are superimposed over the field of view 402. Each content icon 404 represents a unit of digital content stored in the positional content platform 106. The position of any given content icon 404 within the field of view 402 corresponds to the geographic position associated with content represented by the icon. In other words, if a user of the positional content platform 106 elects to create content and associate it with the intersection of $50^{th}$ Street and France Avenue (or the longitude and latitude corresponding with intersection of $50^{th}$ Street and France Avenue), then the content icon 404 representing that content is positioned at the point within the field of view corresponding to the intersection of $50^{th}$ Street and France Avenue. If a map is displayed in the background, the content icon 404 appears at the intersection $50^{th}$ Street and France Avenue on the map.

Optionally, the color of a content icon 404 may be determined by certain characteristics of the content represented by the icon. For example, a content icon 404 may appear in a first color, such as red, in the event that the content represented by the icon 404 makes reference to (or "tags") the user account into which the positional content application 210 is currently logged in. A content icon 404 may appear in a second color, such as green, in the event that any unit of content represented by the icon 404 was created by a user account associated with the currently logged-in account (example: the underlying content contains content created by a user account designated as a "friend," "follower" or a user that the presently logged-in user account has designated to as a user account to "follow."). A content icon 404 may appear in a third color, such as black, in the event that the content represented by the icon 404 has neither of the previously recited characteristics, and is therefore simply public content.

In the event that more than one unit of content is associated with the same geographic position or very similar geographic positions, the field of view 402 could become cluttered with content icons 404 that interfere with one another. To prevent such cluttering, icons that would otherwise interfere with one another are represented by a single aggregator icon 406. Several aggregator icons 406 are depicted in the field of view 402. Optionally, an aggregator icon 406 may bear a number on its face, with the number representing the number of underlying units of content the aggregator icon 406 represents. According to some embodiments, the color of an aggregator icon 406 may be determined by the characteristics of the various units of content is represents in a manner similar to that described with reference to a content icon 404. For example, an aggregator icon 406 may appear in a first color, such as red, in the event that any of the units of content represented by the icon 406 makes reference to (or "tags") the user account into which the positional content application 210 is currently logged in. An aggregator icon 406 may appear in a second color, such as green, in the event that any unit of content represented by the icon 406 was created by a user account associated with the currently logged-in account (example: any unit of the underlying content contains content created by a user account designated as a "friend," "follower" or a user that the presently logged-in user account has designated to as a user account to "follow."). An aggregator icon 406 may appear in a third color, such as black, in the event that the content represented by the icon 406 has neither of the previously recited characteristics, and is therefore simply public content.

Figure 5:
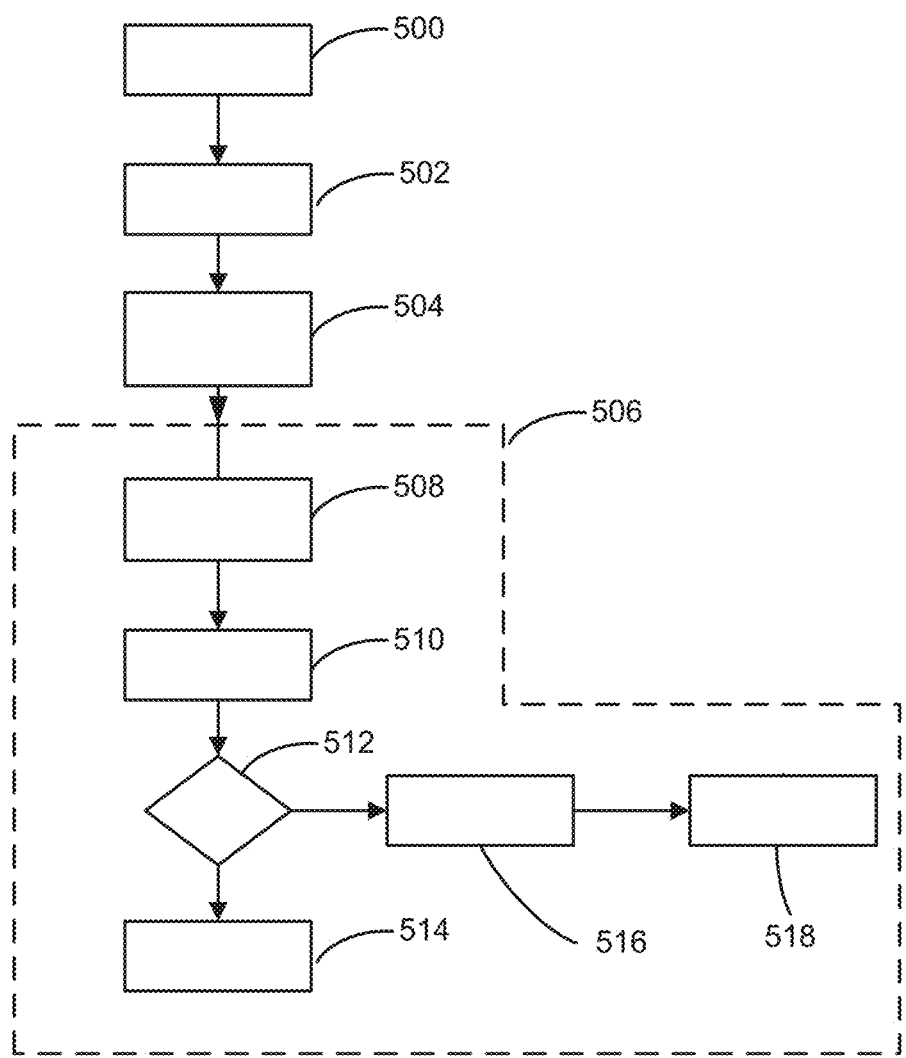
FIG. 5 depicts a method for placing content icons and aggregator icons on a field of view, in accordance with some embodiments of the invention.
Figure 6:
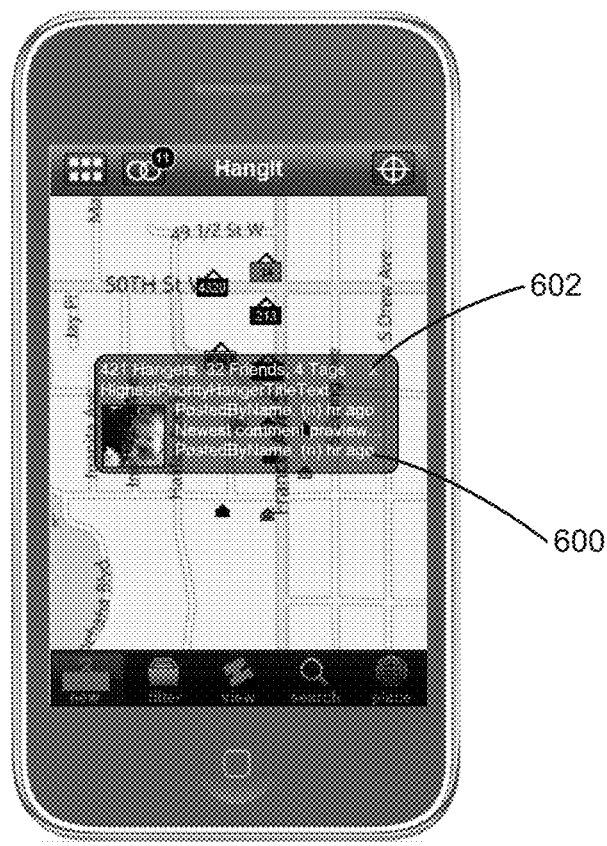
FIG. 6 depicts a content summary in accordance with some embodiments of the invention.

FIG. 5 depicts a method for placing the content icon 404 and aggregator icons 406 on the field of view 402. According to one embodiment, the method of FIG. 5 is executed by the mobile device 102 or 104. In operation 500, a field of view 402 is displayed in the user interface 400. As has previously been discussed, the field of view 402 corresponds to a geographic region of earth. In operation 502, a service call is sent to the service layer 200. The service call may include field of view data, so that the service layer 200 can determine the currently active field of view in the user interface 400. In response to having sent the service call, the positional content application 210 receives a response thereto. The aforementioned response includes data that is descriptive of the individual units of content within the field of view 402, including locational data for each such unit, and, optionally, other summary data for each such unit, including data required for icon 404 and 406 color determination and information required for content summary display, as shown in FIG. 6.

Operations 508-518 can be performed as a single operation in the event of a single unit of content being within the field of view 402, and in the further event that the position and orientation of the mobile device 102 or 104 is known, which may be the case, for example, if the position and orientation was determined by user selection, as opposed to corresponding to the actual physical location and orientation of the device 102 or 104, or, for example, if the position and orientation were previously determined. Given the aforementioned scenario, operation 506 is performed by positioning an icon within the field of view 402 of the user interface 400 as a function of the position associated with the content represented by the icon.

On the other hand, assuming that the conditions recited above are not satisfied, operation 506 may be broken into operations 508-518. In operation 508, the position and orientation of the mobile device 102 or 104 is determined, for example, through use of an on-board gyroscope and GPS unit integral with the mobile device 102 or 104. In operation 508, for example, through calls to location and rotation services in the unit's 102 or 104 operating system, information concerning the unit's 102 or 104 latitude, longitude, altitude, longitudinal accuracy, latitudinal accuracy, vertical accuracy, and rotation around each of the x, y, and z axes may be determined.

In operation 510, the on-screen position of each icon is determined, as a function of the dimensions of field of view 402, the location of each underlying unit of content, and optionally the position and orientation of the mobile device 102 or 104 or chosen position for anchoring of the field of view 402. In query operation 512, is determined whether any of the icons 402 or 404 would overlap one another. If not, operation 514 is performed, and each icon 402 is superimposed on the field of view 402 in the position determined in operation 510. On the other hand, if one or more icons 404 or 406 would, in fact, overlap, then, in operation 516, the overlapping icons are "grouped" and represented as an aggregator icon 406 until there exist no overlapping icons 404 or 406. Finally, in operation 518, each icon 402 or 404 is superimposed on the field of view 402 in the position determined in operation 516.

One of skill in the art will understand that the order of operations shown herein need not be preserved, and that operations may be performed in different orders or concurrently. For example, operation 500 and operations 502 may be performed in any order or at the same time. One of ordinary skill in the art will understand that other such operations may also be performed in sequences other than those shown in FIG. 5 (or in any other Figure depicting a method flow).

The user interface 400 also includes a series of selectable buttons 408-416, the functions of each are the topic of further discussion herein, below.

The user interface 400 further includes a main menu button 418, the selection of which directs the user to a main menu allowing the user to perform various utilitarian operations not of interest in this document, but which will readily present themselves to the mind of one of ordinary skill in the art (manage user account information, etc.).

The user interface also includes a selectable notification button 420, the function of which is the topic of further discussion herein, below.

The user interface 400 also include a a location button 422 the function of which is the topic of further discussion herein, below.

The field of view 402 also a position indicator 424. The position indicator 424 may be positioned as a function of GPS data, i.e., positioned within the field of view 402 to correspond with the actual detected location of the mobile device 102 or 104. As discussed below, certain features of the positional content platform associate content or otherwise function based on the position of the position indicator. According to some embodiments, the position indicator 424 always remains centered in the field of view 402. The user may "swipe" his finger across the touch-screen of the mobile device 102 or 104 to scroll the field of view 402 in the direction of his finger swipe. In that event, the position indicator 424 remains centered within the field of view 402, so that the position indicator 402 effectively changes its position, thereby affecting certain functions and features of the platform 106.

According to some embodiments, the content icons 404 are selectable. Upon selection of a content icon, a content summary 600 is displayed, as depicted in FIG. 6. Typically, the unit of content will be a thread, in that it will be constituted of a plurality of sub-units of content, each of which is, in one form or another, a reply to the original sub-unit of content. Together, each of the sub-units of content constitutes a thread, or a single unit of content. The content summary 600 may include the following data, each of which is optional: the user name of the creator of the original sub-unit of content; the user name of the creator of the most recently created sub-unit of content in the thread (or unit); an indication, in absolute or relative terms, of when the original sub-unit of content was created; an indication, in absolute or relative terms, of when the most recently created sub-unit was created; a picture or graphical image associated with the account of the creator of the original sub-unit of content; a picture or graphical image associated with the account of the creator of the most recently created sub-unit of content; an indication of the number of sub-units of content in the thread; an indication of the number of creators of sub-units within the thread that have been designated as being associated (as a friend/follower, etc.) with the user account currently logged in; an indication of the number of sub-units in the thread in which the logged-in user account had been referenced (or "tagged"). The preceding list is presented by way of example and not by way of limitation. Other types of summary data will readily present themselves to one of ordinary skill in the art.

The content summary 600 includes a selectable close button 602, which, when selected, causes the content summary 600 to vanish from the user interface 400. On the other hand, in response to selection of the content summary 600, the positional content application 210 causes the user interface 400 to present a content detail 700, an embodiment of which is depicted in FIG. 7.

Figure 7:
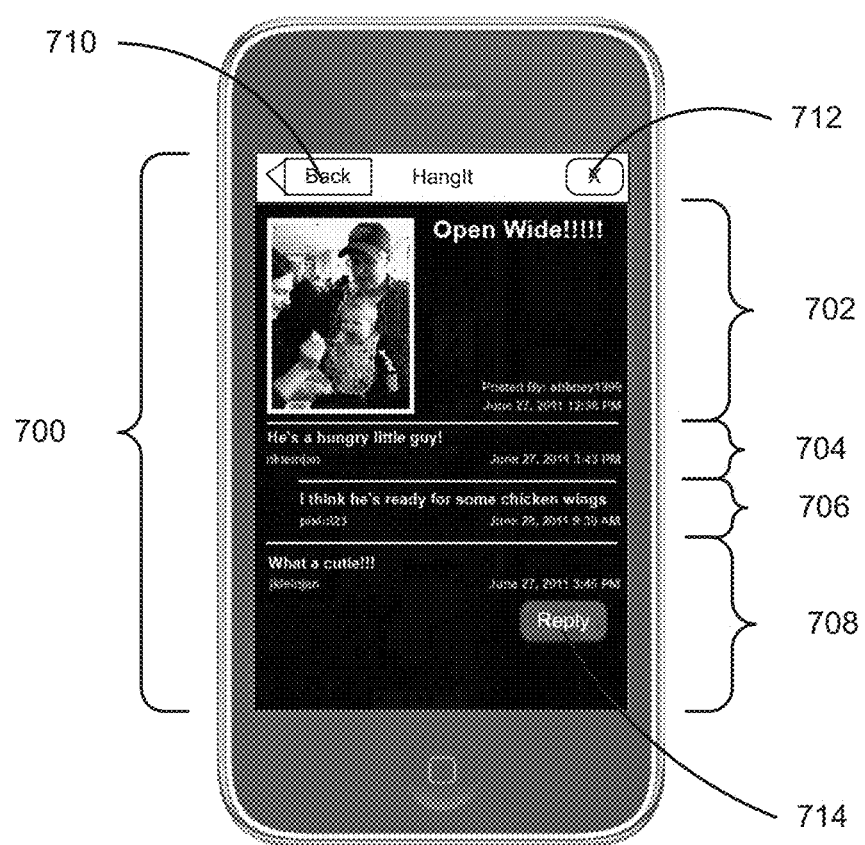
FIG. 7 depicts a content detail in accordance with some embodiments of the present invention.

As can be seen in FIG. 7, the content detail 700 presents a thread or unit of content, which is, in turn, constituted of sub-units 702, 704, 706 and 708. Each sub-unit 702, 704, 706 and 708 has a creator that is a user registered on the positional content platform 106. Each sub-unit is introduced into the thread depicted in FIG. 7 as either a response to the original sub-unit of content 702, or as a response to another sub-unit 704-708 in the thread. Optionally, the content detail 700 may present each sub-unit 702, 704, 706 and 708 in a sequential, indented format, with each sub-unit 702, 704, 706 and 708 being presented beneath, and indented to the right of, the particular sub-unit 702, 704, 706 and 708 to which it is a response. Each sub-unit of content 702, 704, 706 and 708 may include, by way of example only, and not by way of limitation, textual information, graphical imagery, video imagery, audio content, and other forms of digital content, which will readily present themselves to the minds of those of ordinary skill in the art.

The content detail 700 also includes a selectable "back" button 710, when, when selected causes the positional content application 210 to present the content summary 600, such as the one presented in FIG. 6. The content detail 700 also includes a selectable close button 712, which, when selected, causes the content detail 700 to vanish from the user interface 400.

Each sub-unit of content 702, 704, 706 and 708 is presented with a selectable "reply" button 714 presented in a footer below the sub-unit 702, 704, 706 and 708. Selection of the reply button 714 in the footer of a particular sub-unit 702, 704, 706 and 708 of content permits the user to create a sub-unit of content for inclusion in the thread as a response to the particular sub-unit 702, 704, 706 and 708 of content. To enable the user to create such response content, the positional content application 210 presents a create comment screen 800 in the user interface.

According to some embodiments, a content detail 700 or content summary 600 or other unit of content associated with a location may be presented to the user via the user interface, in response to the user entering a region, without requiring the user to make any selection via the user interface or otherwise perform any other action. For example, a message or a coupon or other unit of content representing a discount or rebate to be redeemed or applied to a purchase may be associated with a geographic region. In the event that a user enters the region, the content is presented to the user. For example, a message instructing a user to travel to another particular region may be presented to the user in response to the user being detected within a region associated with the message. After delivery of the message, if the user is detected in the aforementioned other particular region, a unit of content representing a discount or coupon may be presented to the user via the mobile device 102.

According to some embodiments, a unit of content may be completely viewable by a particular user only if that user pays a fee, such as a subscription fee or a pay-per-view fee. For example, a particular content summary 600 may represent such a unit of content. In response to selection of the content summary 600, the user is presented with a message explaining that the content, itself, or the content detail 700, is viewable or encounterable, only if the user first pays a pay-per-view fee or subscription fee. Optionally, the message contains a link to a set of checkout pages that permit the user to tender payments. In response to successful processing of the user's payment, the user may select the content summary, and encounter or view the underlying content detail 700 or content.

Figure 8:
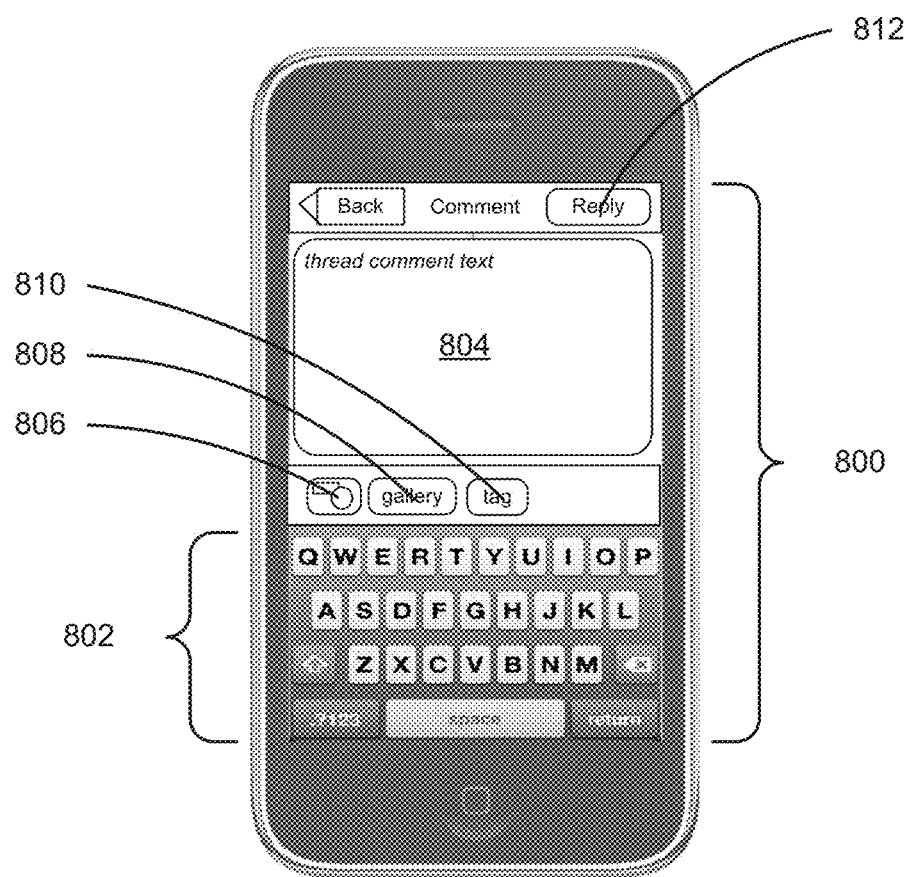
FIG. 8 depicts a create comment screen in accordance with some embodiments of the present invention.

FIG. 8 depicts a create comment screen 800 in accordance with some embodiments. The create comment screen 800 includes a keyboard 802 and a content editing area 804. By virtue of typing on the keyboard 802, corresponding text appears in the content editing area 804. Other forms of content may also be introduced into the content editing area 804. For example, the create comment screen 800 also includes a camera button 806, which, when selected causes the positional content application 210 to present a camera/video interface, by which still and moving video files may be created via a camera on-board the mobile device 102 or 104 and introduced into the content editing area 804. Alternatively, the user may introduce previously captured still and moving video files by selection of the gallery button 808, which presents a gallery of previously captured pictures and videos for selection and inclusion in the content editing area 804.

The create comment screen 800 also includes a tag button 810, which presents a list of selectable user accounts associated with the particular user account that is logged in. Upon selection of one or more of the presented user accounts, the sub-unit of content ultimately created via the create comment screen 800 is "tagged" to the selected user account(s), thereby optionally generating an alert to the "tagged" user account, generating a news feed entry to the tagged user account, altering the color of the corresponding content icon 404 or aggregator icon 406 when viewed via the tagged user account, etc.

The create comment screen 800 contains a post button 812. Upon selection of the post content button 812, the contents of the content editing area 804 is included as a response sub-unit of content to the particular sub-unit of content to which the user selected "reply." Optionally, GPS data regarding the location of the mobile device at the time of selection of the post content button 812 is also obtained and saved by the positional content platform 106, although, according to one embodiment, the position associated with the thread, itself, is not influenced by the positional information of any of the response sub-units of content, i.e., the thread remains positioned at the original position of the original sub-unit of content.

Finally, the create content screen contains a back button 814. Upon selection of the back button 814, the user interface returns to presenting the content detail screen, such as the embodiment depicted in FIG. 7.

In the passages herein discussing FIG. 4, aggregator icons 406 were disclosed. To review, an aggregator icon 406 is an icon that represents a plurality of individual units of content associated with locations in exceptional proximity to one another, such that the placement of individual content icons 404 in a field of view 402 would not be feasible, due to interference/overlap between the content icons 404. According to some embodiments, aggregator icons 406 are selectable. In response to selection of an aggregator icon 406 by a user, an aggregator summary 900 is presented in the user interface 400 by the positional content application 210.

The aggregator summary 900 is a modified version of the content summary 600. To create the aggregator summary 900, the positional content application 210 analyzes each of the units of content represented by the aggregator icon 406, and determines which individual unit of content is most connected to the user account that is presently logged into the application 210. According to one embodiment, for each sub-unit represented by a particular aggregator icon 406, the positional content application 210 sums together the number of times its sub-units of content tags the user account that is presently logged into the application 210 and the number of its sub-units created by friends/followers/followees of the user account that is presently logged into the application 210; the unit of content with the greatest possible sum is designated as unit of content that is most connected to the user account that is presently logged into the application 210. The aggregator summary 900 is a content summary 600 of the aforementioned designated unit of content.

The aggregator summary 900 includes a selectable close button 902, which, when selected, causes the aggregator summary 900 to vanish from the user interface 400. On the other hand, in response to selection of the aggregator summary 900, the positional content application 210 causes the user interface 400 to present an aggregator detail 1000, an embodiment of which is depicted in FIG. 10.

Figure 10:
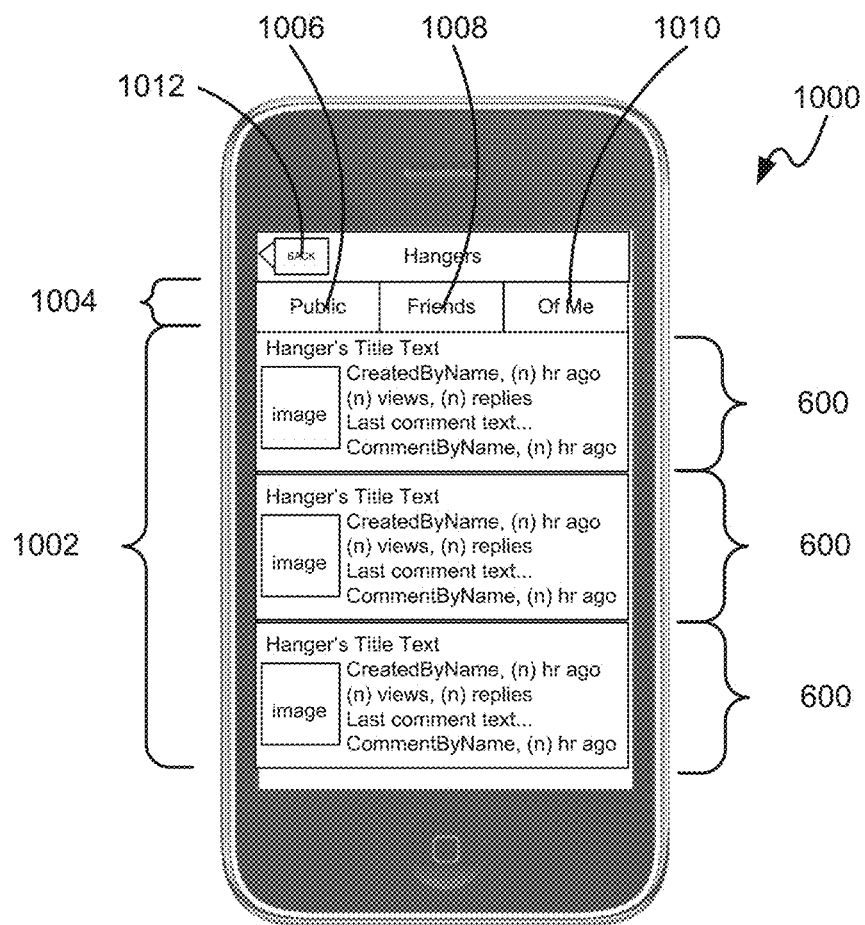
FIG. 10 depicts an aggregator detail in accordance with some embodiments of the present invention.

As can be seen from FIG. 10, the aggregator detail 1000 includes a summary area 1002 and a quick-filter area 1004. The summary area 1002 contains individual content summary data 600 of each unit of content represented by the aggregator icon 406. The summary area 1002 is scrollable. According to one embodiment, a user may swipe his or her finger vertically along the touch screen area containing the summary area 1002, causing the summary area to scroll, and the particular content summaries 600 contained therein to change, in order to accommodate circumstances in which there are more content summaries 600 than can fit within the summary area 1002. Selection of a particular content summary 600 causes the corresponding content detail 700, such as the embodiment depicted in FIG. 7, to be presented.

The quick-filter area 1004 contains three buttons: a public quick-filter button 1006, a friends-only quick-filter button 1008 and a tagged quick-filter button 1010. Selection of the public quick-filter button 1006 has two effects. First, it causes the summary area 1002 to be populated by all content summaries 600 of units of content represented by the aggregator icon 406, regardless of the creators of that unit's individual sub-units of content. Second, selection of the public quick-filter button 1006 unselects the friends-only quick-filter button 1008.

Selection of the friends-only quick-filter button 1008 has two effects. First, it causes the summary area 1002 to be populated by only those content summaries 600 of units of content having sub-units that were created by user accounts that had been designated as friends of the particular user account presently logged into the positional content application 210. Second, selection of the friends-only quick-filter button 1008 unselects the public quick-filter button 1006.

Selection of the tagged quick-filter button 1010 causes the summary area to be populated by only those content summaries 600 of units of content having sub-units that "tag" the particular user account presently logged into the positional content application 210.

Figure 9:
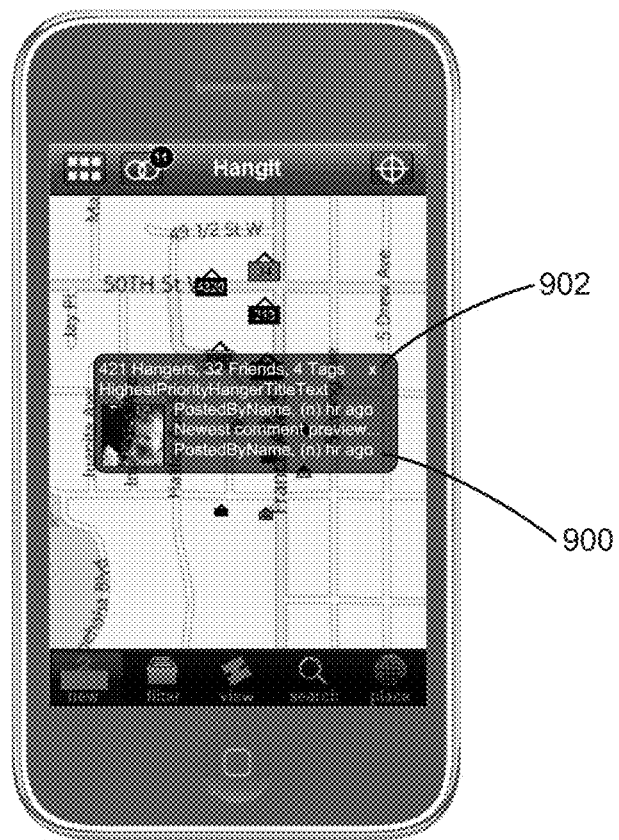
FIG. 9 depicts an aggregator summary in accordance with some embodiments of the present invention

The aggregator detail 1000 also includes a back button 1012, the selection of which returns the user interface to the aggregator summary 900, such as the particular embodiment depicted in FIG. 9.

Figure 11:
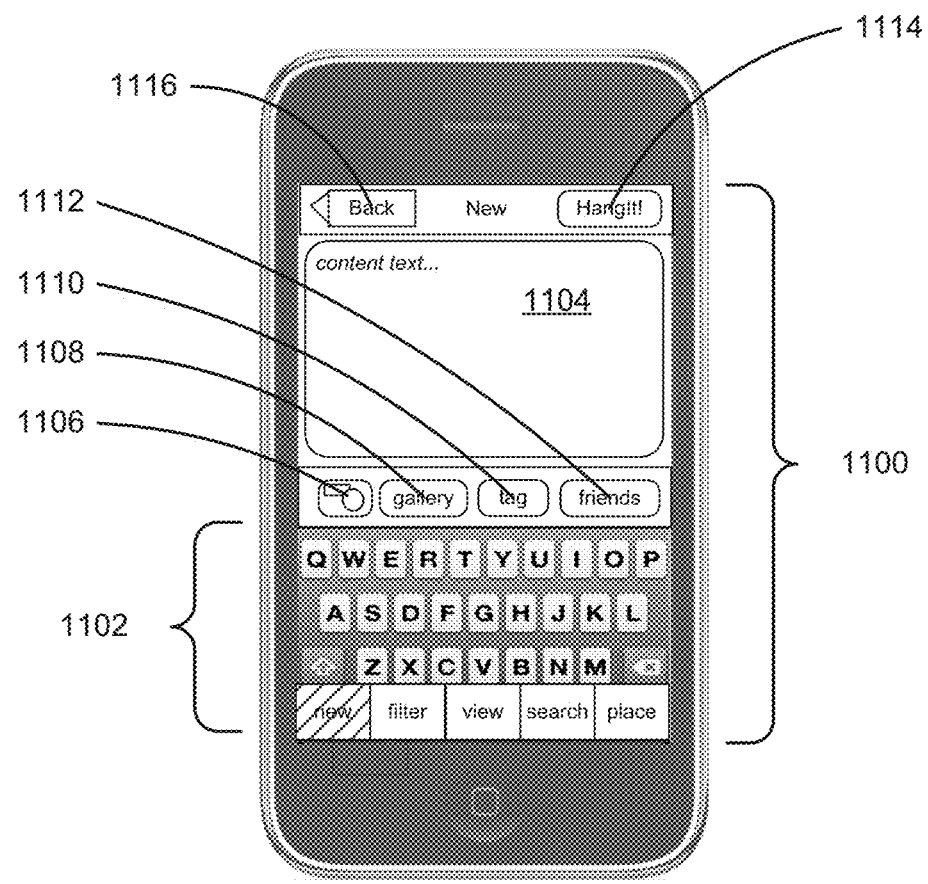
FIG. 11 depicts a create content screen in accordance with some embodiments of the present invention.

FIG. 11 depicts a create content screen 1100, according to some embodiments. The create content screen 1100 is presented in the user interface 400, in response to selection of the create new content button 408 along the bottom edge of the field of view 402. The create content screen 1100 includes a keyboard 1102 and a content editing area 1104. By virtue of typing on the keyboard 1102, corresponding text appears in the content editing area 1104. Other forms of content may also be introduced into the content editing area 1104. For example, the create content screen 1100 also includes a camera button 1106, which, when selected causes the positional content application 210 to present a camera/video interface, by which still and moving video files may be created via a camera on-board the mobile device 102 or 104 and introduced into the content editing area 1104.

Figure 12:
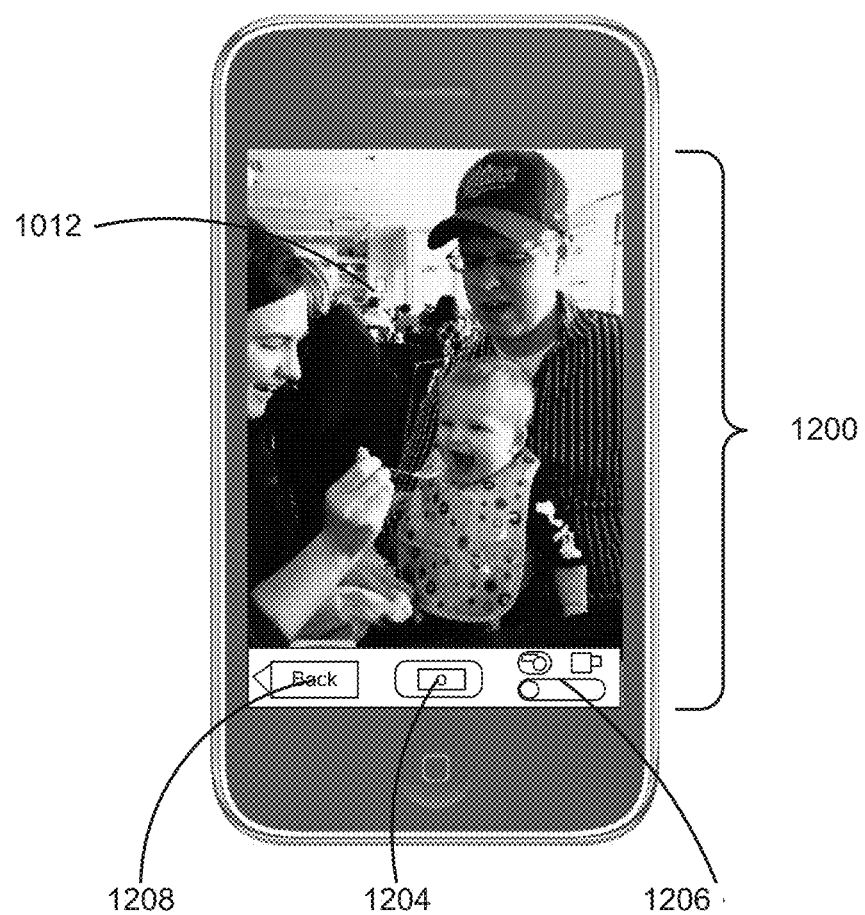
FIG. 12 depicts a camera/video interface in accordance with some embodiments of the present invention.
Figure 13:
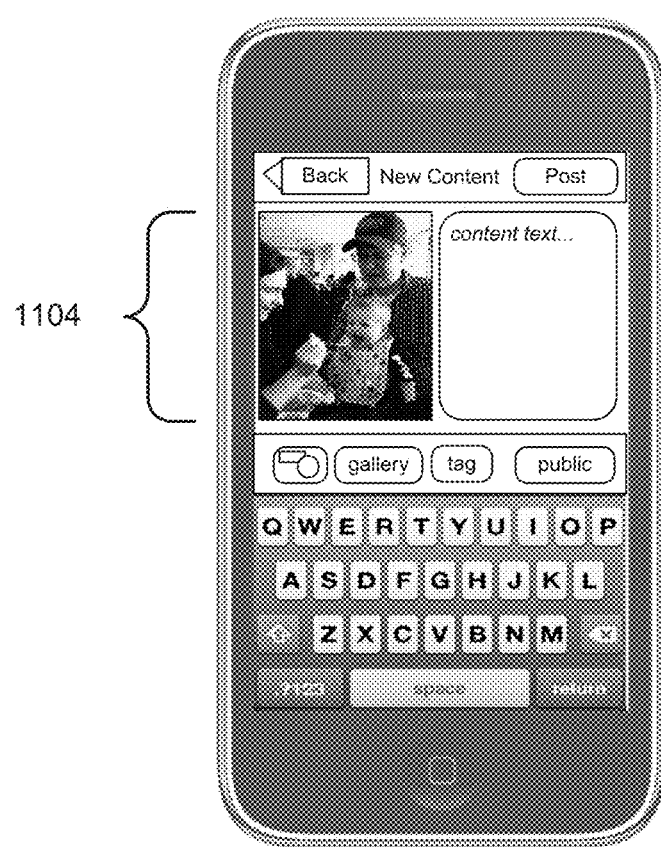
FIG. 13 depicts a create content screen with an image introduced into the content editing area, in accordance with some embodiments of the present invention.

FIG. 12 depicts a camera/video interface 1200, in accordance with some embodiments. The camera/video interface 1200 is presented in response to selection of the camera button 1106 in the create content screen 1100. The camera/video interface 1200 includes a display region 1202. The display region 1202 present real-time imagery as it is being captured from the on-board camera 332 (FIG. 3). The user may select the capture button 1204 to capture the image currently presented in the display region 1202. In the event that the slide selector 1206 is set to the "camera" mode, the captured image is stored as an in image file, and is introduced into the content editing area 1104, as shown in FIG. 13. On the other hand, in the event that the slide selector 1206 is set to the "video" mode, a video file is captured, with the start of the video file being triggered by the initial selection of the capture button 1204, and the end of the video file being triggered by the subsequent selection of the capture button 1204. According to some embodiments, the video file is introduced into the content editing area 1104 in a manner like the image content was introduced. The camera/video interface 1200 also includes a "back" button 1208, selection of which causes the user interface 400 to return to the create content screen 1100.

The create content screen 1100 also includes a gallery button 1108. The user may introduce previously captured still and moving video files by selection of the gallery button 1108, which presents a gallery of previously captured pictures and videos for selection and inclusion in the content editing area 1104.

The create content screen 1100 also includes a tag button 1110, which presents a list of selectable user accounts associated with the particular user account that is logged in. Upon selection of one or more of the presented user accounts, the sub-unit of content ultimately created via the create content screen 1100 is "tagged" to the selected user account(s), thereby optionally generating an alert to the "tagged" user account, generating a news feed entry to the tagged user account, altering the color of the corresponding content icon 404 or aggregator icon 406 when viewed via the tagged user account, etc.

The create content screen 1100 also includes a visibility button 1112 that controls the set of users of the positional content platform 106 that can find and view the content. According to some embodiments, the visibility button 1112 functions as a toggle button, and can be in one of two states: "friends only," in which case the content created in the content editing area 1104 and ultimately included in the thread, is visible only to those users of the positional content platform 106 that have been designated as having a "friend" relationship with the user account presently logged into the positional content application 210; and "public," in which case the content created in the content editing area 1104 and ultimately included in the thread, is visible to all users of the positional content platform 106.

The create content screen 1100 contains a post content button 1114. Upon selection of the post content button 1114, position data is associated with the content. In the event that the field of view 402 is presenting the current location of the mobile device 102 or 104, then GPS data regarding the location of the mobile device 102 or 104 at the time of selection of the post content button 1114 is obtained and associated with the content. In the event that the user has elected to manually center the field of view 402 about another location, then the content is associated with the positional data of the aforementioned other location. The content, associated locational data and data concerning the populace of users permitted to view the data is sent to the service layer 200 via a service call. In response, the service layer 200 stores the content (and aforementioned associated data) in physical database storage 206, meaning that the unit of content becomes discoverable and viewable by the chosen user population at the chosen location.

Finally, the create content screen 1100 contains a back button 1116. Upon selection of the back button 1116, the user interface returns to presenting the field of view 402, such as the embodiment depicted in FIG. 4.

Figure 14:
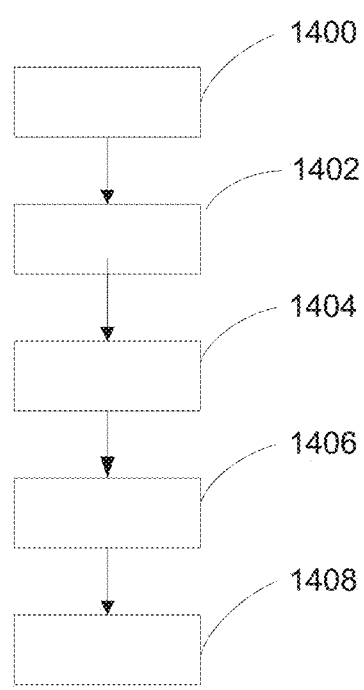
FIG. 14 depicts a method for creating content, in accordance with some embodiments of the present invention.

FIG. 14 depicts a method carried out by the positional content application 210 for creating content, according to some embodiments. As can be seen from FIG. 14, the method commences with operation 1400, in which the positional content application 210 displaying a user interface 400 that presents a field of view 402 representative of a region on earth. In operation 1402, the positional content application 210 presents a user interface by which a user may generate digital content. Additionally, in operation 1404, the positional content application 210 presents an on the user interface 400 a selectable option to render the digital content discoverable only by other users designated by said user (such as friends), or to render the content discoverable by all other users of the positional content platform 106. Next, in operation 1406, the content is created by aggregating the content together with the chosen positional data and data concerning the population of users permitted to discover the content. Finally, in operation 1408, the a service call is sent to the service layer 200. The service call includes the positional data, the digital content and the data concerning the population of users permitted to discover the content. In response, the service layer 200 stores the content (and aforementioned associated data) in physical database storage 206, meaning that the unit of content becomes discoverable and viewable by the chosen user population at the chosen location.

Figure 15:
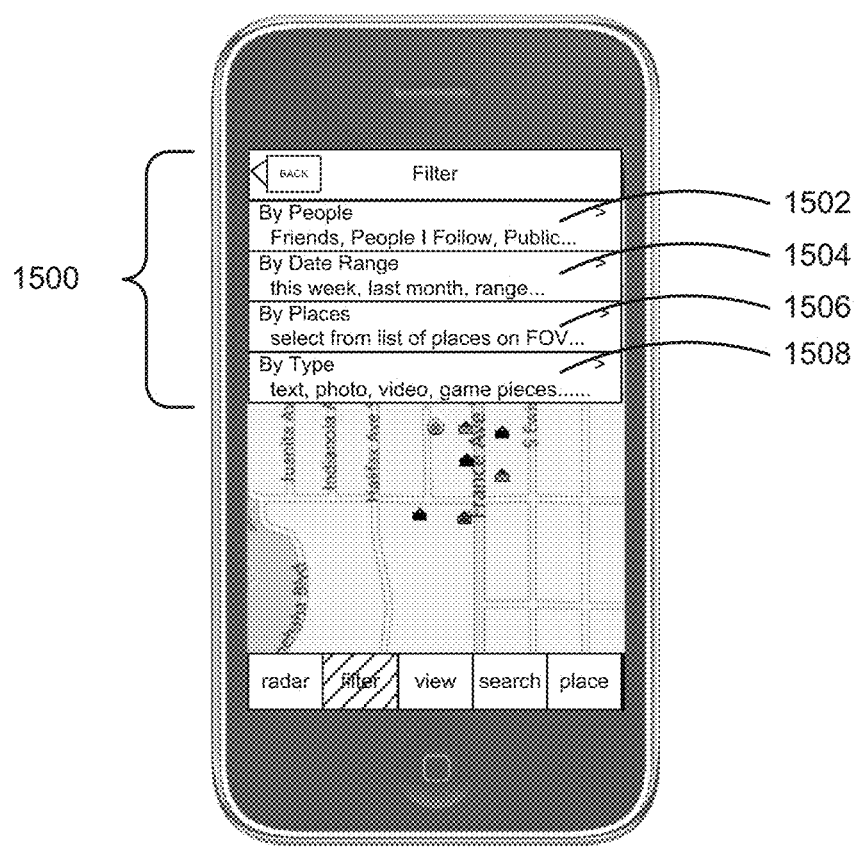
FIG. 15 depicts a filter menu in accordance with some embodiments of the present invention.

FIG. 15 depicts a filter menu 1500, presented atop the field of view 402. The filter menu 1500 is presented in the user interface 400, in response to selection of the filter menu button 410 along the bottom edge of the field of view 402. According to some embodiments, the filter menu includes four selection items: a filter-by-people item 1502; a filter-by-date item 1504; a filter-by-place item 1506; and a filter-by-type item 1508. Selection of each of the aforementioned items 1502-1508 presents various interfaces permitting the user to establish filter criteria. By virtue of application of such criteria, icons 404 and 406 will be presented within the field of view 402 if and only if the units of content referenced by the icons 404 and 406 meet the established filter criteria.

In response to selection of the filter-by-people item 1502, an interface is presented. The interface permits the user to establish various filter criteria. For example, the interface presents options permitting the user to establish the following criteria for presentation within the field of view 402: the creator of unit of content is a friend; creator of any sub-unit of content within a unit of content is a friend; the creator of unit of content is a follower; the creator of any sub-unit of content within a unit of content is a follower; the creator of unit of content is followed; the creator of any sub-unit of content within a unit of content is followed; the unit of content tags the user account that is presently logged into the positional content application 210; any sub-unit of content within the unit of content tags the user account that is presently logged into the positional content application 210; the unit of content tags any user account that is designated as a friend; and, any sub-unit of content of a unit of content tags any user account that is designated as a friend. The preceding list is exemplary, and is not limiting. According to some embodiments, multiple filter criteria are applied conjunctively. According to some embodiments, multiple filter criteria are applied disjunctively.

In response to selection of the filter-by-date item 1504, an interface is presented. The interface permits the user to establish various filter criteria. For example, the interface presents options permitting the user to establish the following criteria for presentation within the field of view 402: the unit of content was created or changed within the present day; any sub-unit of content within the unit of content was created or changed within the present day; the unit of content was created or changed within a chosen period of time; and, any sub-unit of content within the unit of content was created or changed within a chosen period of time. The preceding list is exemplary, and is not limiting. According to some embodiments, multiple filter criteria are applied conjunctively. According to some embodiments, multiple filter criteria are applied disjunctively.

In response to selection of the filter-by-place item 1506, an interface is presented. The interface permits the user to establish various filter criteria. For example, the interface presents options permitting the user to establish the following criteria for presentation within the field of view 402: the unit of content is associated with a location within a region designated as a place; the unit of content is associated with a location within a region that is designated a particular place or set of places chosen from a list. The preceding list is exemplary, and is not limiting. According to some embodiments, multiple filter criteria are applied conjunctively. According to some embodiments, multiple filter criteria are applied disjunctively.

In response to selection of the filter-by-type item 1508, an interface is presented. The interface permits the user to establish various filter criteria. For example, the interface presents options permitting the user to establish the following criteria for presentation within the field of view 402: the unit of content includes text; the unit of content contains text only; the unit of content or any of its sub-units contains text; the unit of content and any of its sub-units contains text only; the unit of content includes an image; the unit of content contains an image only; the unit of content or any of its sub-units contains an image; the unit of content and any of its sub-units contains an image only; the unit of content includes video; the unit of content contains video only; the unit of content or any of its sub-units contains video; the unit of content and any of its sub-units contains video only; the unit of content includes audio; the unit of content contains audio only; the unit of content or any of its sub-units contains audio; and, the unit of content and any of its sub-units contains audio only. The preceding list is exemplary, and is not limiting. According to some embodiments, multiple filter criteria are applied conjunctively. According to some embodiments, multiple filter criteria are applied disjunctively.

The filter menu 1500 also includes a back button 1510. Selection of the back button 1510 causes the filter menu 1500 to vanish from the user interface, restoring the view to the field of view 402.

Figure 16:
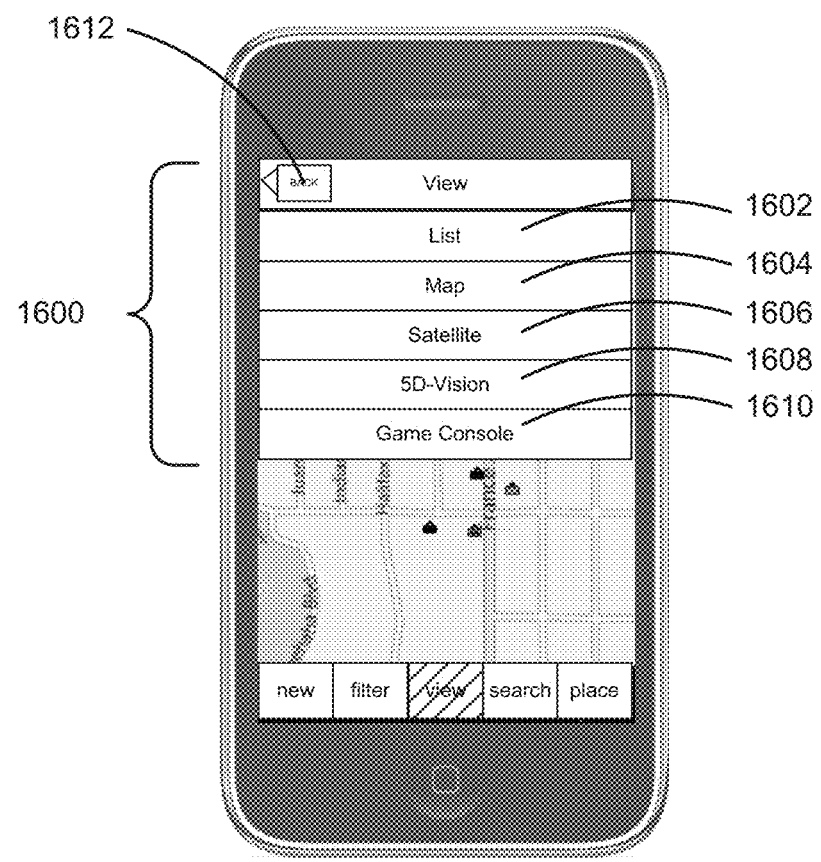
FIG. 16 depicts a view menu in accordance with some embodiments of the present invention.

FIG. 16 depicts a view menu 1600, presented atop the field of view 402. The view menu 1600 is presented in the user interface 400, in response to selection of the view menu button 412 along the bottom edge of the field of view 402. According to some embodiments, the view menu 1600 includes six selection items: a list item 1602; a map item 1604; a satellite item 1606; a 5-D Vision item 1608; and, a game counsel item 1610. Selection of each of the aforementioned items 1602-1610 affects the field of view 402 in some manner.

Selection of the list item 1602 causes the field of view 402 to be replaced by a simple ordered list of all of the units of content within the field of view 402. This view may be convenient in a particularly crowded environment.

Selection of the map item 1604 causes the field of view 402 to display a map of the roads and other features of interest, so that the user can relate the field of view 402 to a specific geographic region.

Selection of the map item 1606 causes the field of view 402 to display a satellite imagery of the geographic region corresponding to the field of view 402, so that the user can observe a top view of the physical environment in the geographic region corresponding to the field of view 402.

Selection of the 5-D item 1608 causes the field of view 402 to be presented in accordance with the 5-D view described with reference to FIG. 20.

Selection of the game counsel item cause the field of view 402 to include units of content that are part of a game played through the positional content platform.

The view menu 1600 also includes a back button 1612. Selection of the back button 1612 causes the view menu 1600 to vanish from the user interface 400.

Figure 17:
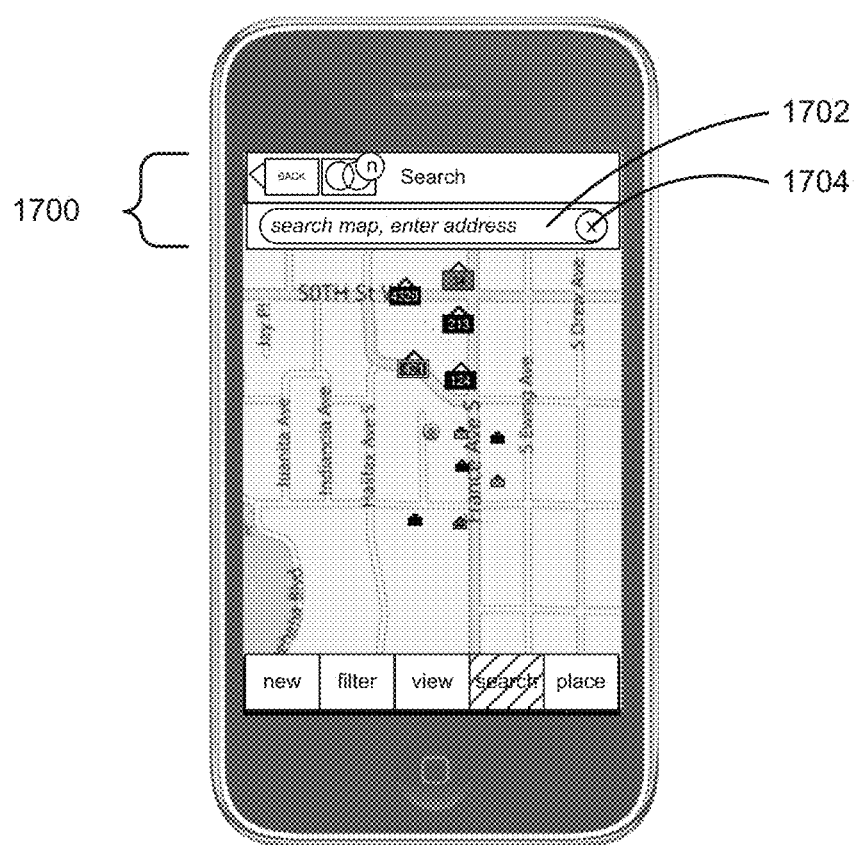
FIG. 17 depicts a search menu in accordance with some embodiments of the present invention.

FIG. 17 depicts a search menu 1700, presented atop the field of view 402. The search menu 1700 is presented in the user interface 400, in response to selection of the search button 414 along the bottom edge of the field of view 402. According to some embodiments, A text box 1702 is presented. Within the text box 1702, the user may enter the name of a previously designated "place" or may enter an address. In either event, the positional content application 210 responds by adjusting the field of view 402 so that the position indicator 424, which according to one embodiment remains centered in the field of view 402, is located at the "place" or address entered in the text box 1702. The search menu 1700 also includes a cancel button 1704, the selection of which causes the search menu 1700 to vanish from the user interface 400.

Figure 18:
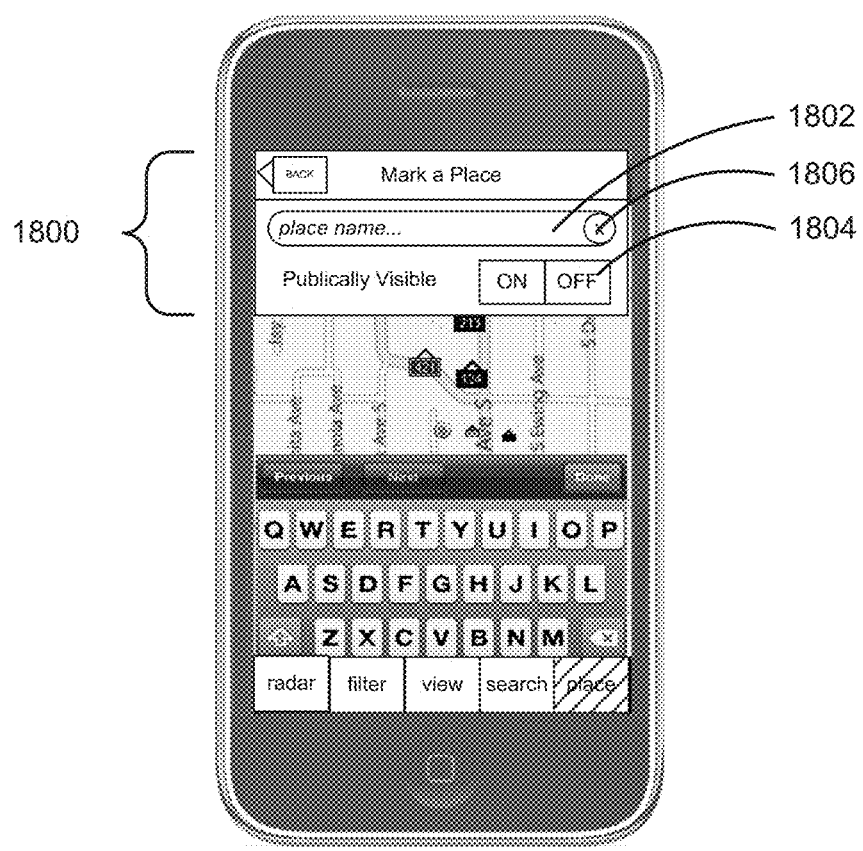
FIG. 18 depicts a mark place interface in accordance with some embodiments of the present invention.

FIG. 18 depicts a mark place interface 1800, presented atop the field of view 402. The mark place interface 1800 is presented in the user interface 400, in response to selection of the mark place button 416 along the bottom edge of the field of view 402. According to some embodiments, the mark place interface 1800 includes a text box 1802. By entry of a name within the text box 1802, a region defined by the location of the position indicator 424 and a radius extending outwardly therefrom is associated with the name, and designated as a place. Thus, data defining the region, and the chosen name of the region, are communicated to the service layer 200 for storage in the physical storage layer 206, thereby designating a specified geographic region as a "place." According to some embodiments, the aforementioned radius is of a length that is determined as a default value. According some embodiments, the aforementioned radius has a selectable length. According to some embodiments, a place is defined as a region bounded by a pair of longitudinal coordinates and a pair of latitudinal coordinated, with the region being centered about the geographic position corresponding to the position indicator 424.

According to some embodiments, the mark place interface 1800 includes a pair of scope buttons 1804. The pair of scope buttons 1804 indicates the chosen scope of population of users that can recognize the designated geographic region as a place. If the pair of scope buttons 1804 is selected to "on," then all of the users of the platform 106 will recognize the aforementioned region as a "place." On the other hand, if the pair of scope buttons 1804 is set to "off," then only those users designated as friends can recognize the designated geographic region as a place. Information pertaining to the selected population scope is communicated in the above-described service call for storage in the physical storage layer 206.

The mark place interface 1800 also includes a cancel button 1806, the selection of which causes the mark place interface 1800 to vanish from the user interface 400.

Figure 19:
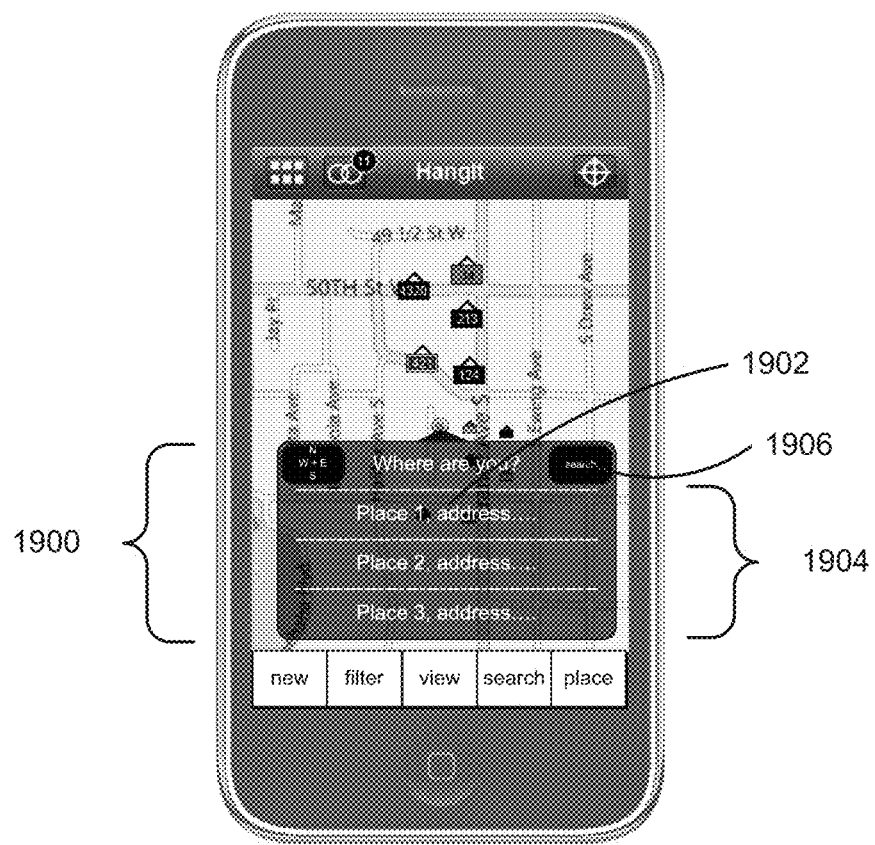
FIG. 19 depicts a positional selection menu in accordance with some embodiments of the present invention.

FIG. 19 depicts a positional selection menu 1900, presented atop the field of view 402. The positional selection menu 1900 is presented in the user interface 400, in response to selection of the positional selection button 422 along the top edge of the field of view 402. According to some embodiments, the positional selection menu 1900 includes a current location item 1902 and a set 1904 of "places" that have been previously designated, such as through use of the interface described with reference to FIG. 18. Selection of the current location item 1902 causes the positional content application 210 to shift the field of view 402, so that it is centered about the current location indicted by the GPS system of the mobile device 102 or 104, meaning that the position indicator 424 is positioned at the current location of the mobile device 102 or 104. The user may also select a previously designated place from the set 1904 of places presented in the menu. Selection of a "place" from the menu causes the positional content application 210 to shift the field of view 402, so that it is centered about the region associated with the place, meaning that the position indicator 424 is positioned at the center of the geographic region associated with the place.

According to some embodiments, the positional selection menu 1900 includes a search button 1906. Selection of the search button presents a text box, permitting the user to enter the name of a previously designated "place." The positional content application 210 responds in a manner identical to its response if the place was selected from the menu items 1904. According to some embodiments, the user may enter a street address, causing the positional content application to shift the field of view 402, so that it is centered about location associated with the street address, meaning that the position indicator 424 is positioned at the center of the region associated with the street address.

Figure 20:
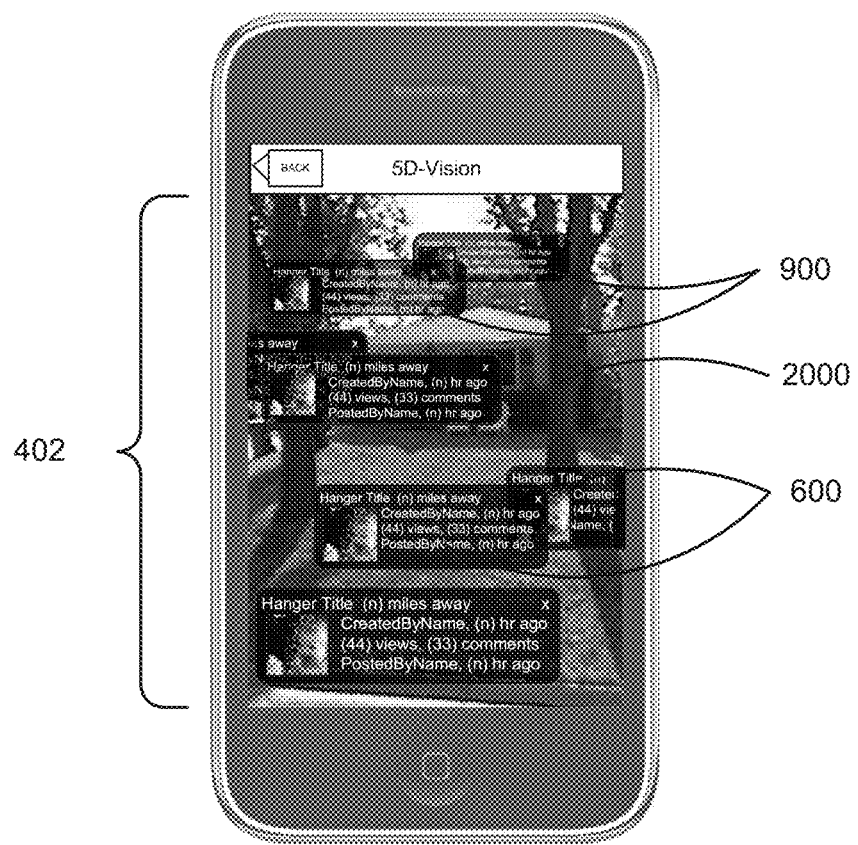
FIG. 20 depicts a 5-D view in accordance with some embodiments of the present invention.

FIG. 20 depicts a field of view 402, as it is presented after selection of the 5-D item 1608 from the view menu 1600 (FIG. 160). The field of view 402 as presented in FIG. 18 includes imagery 2000 presented in real-time from the camera 322 on-board the mobile device 102 or 104. According to some embodiments, the 5-D field of view 402 includes content summaries 600 and aggregator summaries 900 super imposed over the real-time imagery 2000 (this is depicted in FIG. 20). According to other embodiments, the 5-D field of view includes content icons 404 and aggregator icons 406.

According to some embodiments, the positional content application 210 determines its current location and orientation of the phone using the on-board GPS system and gyroscope, for example. For example, the application 210 determines that the mobile device 102 or 104 is located at the intersection of a particular latitude and particular longitude, and is oriented such that the rear surface of the phone is pointed 35° off of magnetic north. The application 210 then constructs a region based upon the detected position and orientation. The constructed region serves as the field of view 402. For example, the application may create a region defined as the geographic space within a particular radius (example: 200 meters) of the current position of the device 102 or 104, and within a certain tolerance (for example, within ±15° of the detected orientation). Carrying on the example, the constructed region is defined as: the set of geographic space within 200 meters of the current location of the mobile device, and between 20° and 50° off of magnetic north. The application sends a service call to the service layer 200 to query the database 202 for content within the constructed field of view. In response to having sent the service call, the positional content application 210 receives a response from the service layer 200. The response includes data that is descriptive of the individual units of content within the constructed field of view 402, including locational data for each such unit, and, optionally, other summary data for each such unit, including data required for icon 404 and 406 color determination and information required for content summary 600 display or aggregator summary 900 display. The application superimposes the icons 404 and 406 or summaries 600 and 900 on the display in a manner similar to that described with reference to FIG. 5. According to some embodiments, the vertical positioning of an icon 404 and 406 or summary 600 and 900 is determined by the geographic distance between the current location of the mobile device and location associated with the unit of content reference by the icon 404 and 406 or summary 600 and 900. For example, icons 404 and 406 or summaries 600 and 900 referencing relatively closer content may appear closer to the bottom edge of the screen, while icons 404 and 406 or summaries 600 and 900 referencing relatively further content may appear closer to the top edge of the screen. According to some embodiments, the horizontal positioning of an icon 404 and 406 or summary 600 and 900 is determined by a polar expression of the location associated with the content reference by a particular icon 404 and 406 or summary 600 and 900. For example, a particular unit of content may be positioned at a distance, d, from the current position of the device 102 or 104, and at an angle, θ, from the detected orientation. If the angle, θ, is close to zero, then the icon 404 and 406 or summary 600 and 900 is presented close to the center of the screen. On the other hand, if the angle, θ, is close to the aforementioned negative or positive tolerance (carrying the previous example forward: θ is close to ±15° from the detected orientation), the icon 404 and 406 or summary 600 and 900 is presented close to either edge of the screen.

Figure 21:
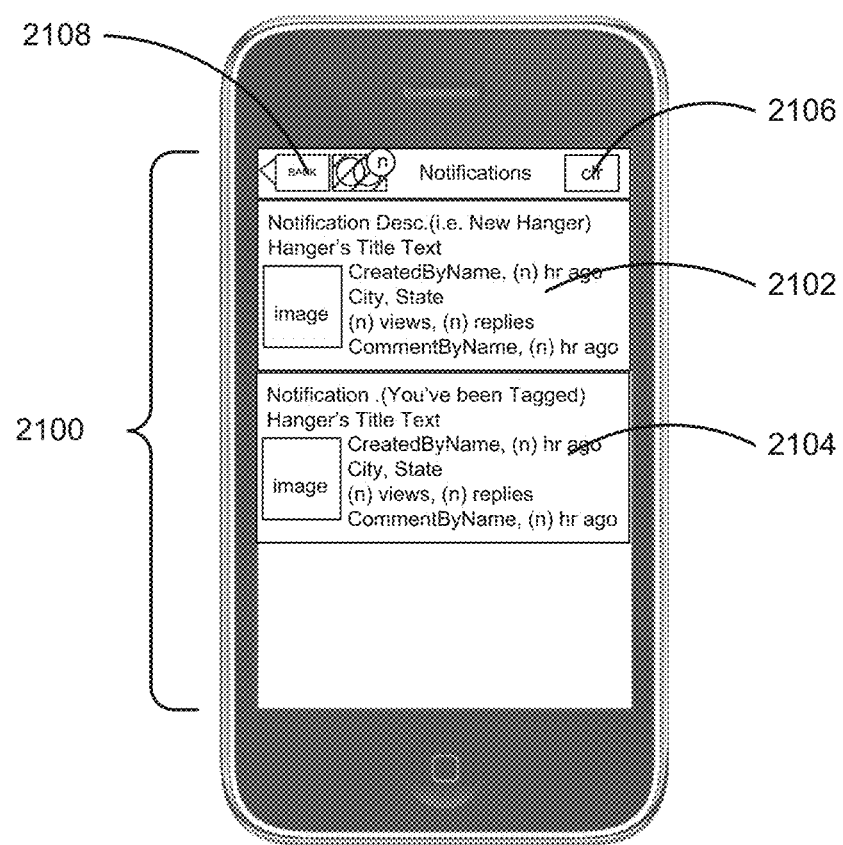
FIG. 21 depicts a notifications center in accordance with some embodiments of the present invention.

FIG. 21 depicts a notifications center 2100, in accordance with some embodiments. According to some embodiments, while the positional content application 210 is executing in the foreground, upon the occurrence of an even that would trigger a notification (see the discussion with respect to FIG. 1 pertaining to notifications), a distinctive audio file, such as beeps, or tones, or a music clip, etc., is played, alerting the user to the presence of a notification. According to some embodiments, while the positional content application 210 is executing in the foreground, upon the occurrence of an even that would trigger a notification, the application 210 causes the mobile device 102 or 104 to vibrate. According to some embodiments, in addition to the aforementioned audio and vibrational indications of a notification, the notifications icon 420 is badged in response to the occurrence of an event that triggers a notification. For example, as can be seen in FIG. 4, the notifications icon 420 therein is superimposed with a badge bearing the number "11." According to some embodiments the badge bears a number indicating the number of unviewed notifications that have occurred.

According to some embodiments, the notifications icon 420 is selectable. In response to selection of the notifications icon, the notifications center 2100 is presented in the user interface 400. As can be seen from FIG. 21, the notifications center 2100 includes individual notification details 2102 and 2104. Each notification detail 2102 or 2104 contains information concerning the nature of the event that triggered the notification. For example, a notification detail 2102 or 2104 may state the date, time, location and identity, etc. of a creator of a unit of content, or a notification detail 2102 or 2104 may include information stating the date and time that a particular user account was observed entering or exiting a designated place.

According to some embodiments, in the event that the application is not executing in the foreground, the occurrence of a notification is indicated by the presentation of a banner containing a message indicating that the notification has occurred. Optionally, the occurrence may also be indicated by the playing of an audio file, or by a vibration. The user may then bring the positional content application 210 to the foreground and view the notification detail 2102 or 2104 in the notification center 2100, as described above.

According to some embodiments, in the event that the application 210 is not executing in the foreground, because the mobile device is in a "sleep" state, the occurrence of a notification is indicated by the presentation of a message on the lock screen of the device 102 or 104. Optionally, the occurrence may also be indicated by the playing of an audio file, or by a vibration. The user may then bring the positional content application 210 to the foreground and view the notification detail 2102 or 2104 in the notification center 2100, as described above. Optionally, the message on the lock screen may be configured so that in response to the user "swiping" his finger across the message, the user is presented with the notification center in order to view the corresponding notification detail 2102 or 2104.

The notifications center 2100 also includes a clear button 2106. Selection of the clear buttons causes the notification details 2102 and 2104 contained within the notification center 2100 to be deleted, and therefore removes the badging from the notifications icon 420.

The notifications center 2100 also includes a back button 2108. Selection of the back button 210 causes the notifications center 2100 to vanish from the user interface 400.

Figure 22:
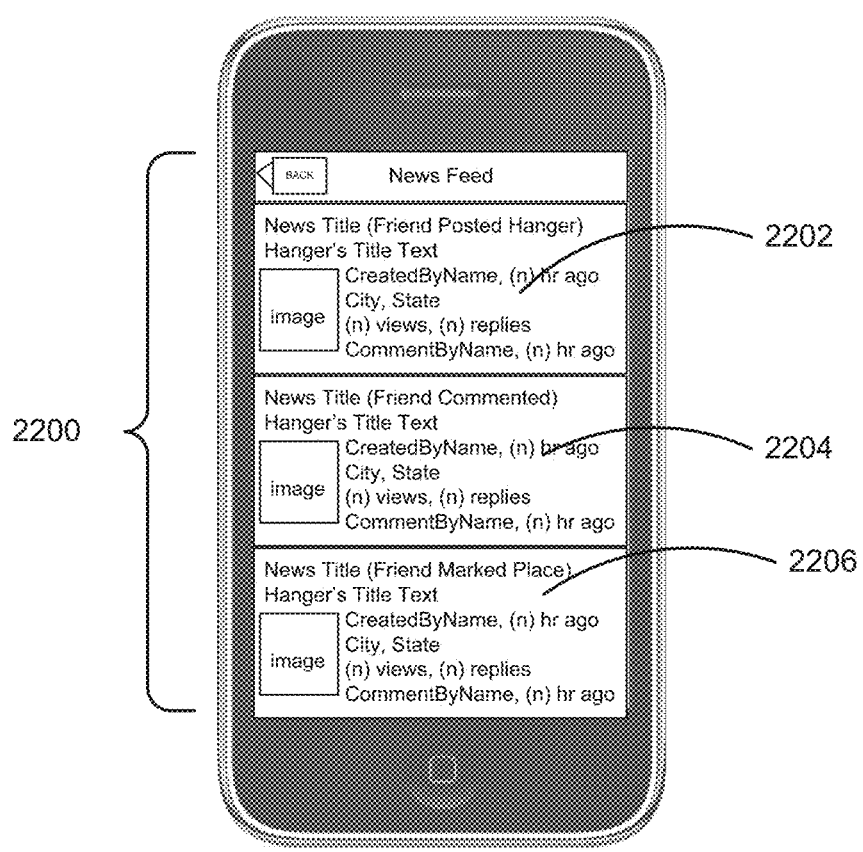
FIG. 22 depicts a newsfeed screen in accordance with some embodiments of the present invention.

FIG. 22 depicts a newsfeed screen 2200, in accordance with some embodiments.

The newsfeed screen 2200 is presented in response to selection of a newsfeed menu option, which is presented on a menu that, in turn, is presented from a menu that is presented in response to selection of the menu button 418

(FIG. 4). As can be seen from FIG. 22, the newsfeed screen 2200 includes a plurality of newsfeed details 2202, 2204 and 2206. Each newsfeed detail 2202, 2204 and 2206 contains information concerning the nature of the platform 106 event giving rise to entry in the newsfeed 2200. For example, a newsfeed detail 2202, 2204 and 2206 may state the date, time, location and identity, etc. of a creator of a unit of content, a newsfeed detail 2202, 2204 and 2206 may include information stating the date and time that a particular user account was observed entering or exiting a designated place, a newsfeed detail 2202, 2204 and 2206 may include the date and time that a particular user, such as a user that was previously designated as a friend/follower or otherwise designated as bearing an association with the user account that is presently logged into the positional content application 210 on another platform, joined the platform 106.

Figure 23:
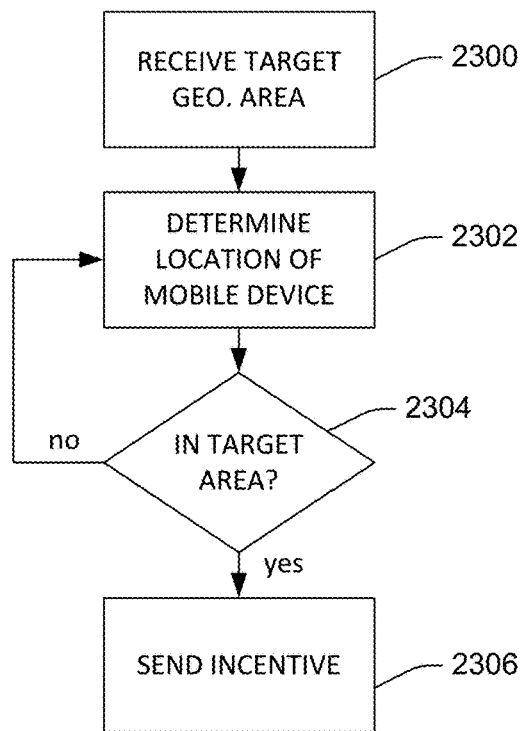
FIG. 23 depicts an example of a method for providing a customer or potential customer an incentive to leave one merchant's location and go to another merchant's establishment in accordance with some embodiments of the present invention.

In accordance with other embodiments, disclosed location messaging systems are employed in systems and methods for providing a customer or potential customer an incentive to leave one location, such as the location of a competitive merchant, and go to another merchant's establishment. FIG. 23 conceptually illustrates an example of such a method. In operation 2300, a first geographic area including a first commercial location is defined. Typically, the first geographic area is defined by a merchant representing a business establishment such as a restaurant, sometimes referred to as the "enticing merchant" herein. In such an example embodiment, the first commercial location is the location of a target establishment, such as a competing restaurant. The commercial location can be defined by the enticing merchant using a computer application, an example of which is discussed further later herein.

In operation 2302, the location of a mobile device such as the mobile device 102 or 104 in the possession of the consumer is determined. For simplicity, in the following examples the customer is considered to be in possession of the mobile device 102 located at location L1 illustrated in FIG. 1. As shown in operation 2304, if the mobile device 102 is determined to be at a location within the first geographic area, then an incentive message for the customer to leave the location L1 and go to a second commercial location is sent to the mobile device in operation 2306. If the mobile device 102 is not within the first geographic area, then the location of the mobile device continues to be monitored.

Figure 24:
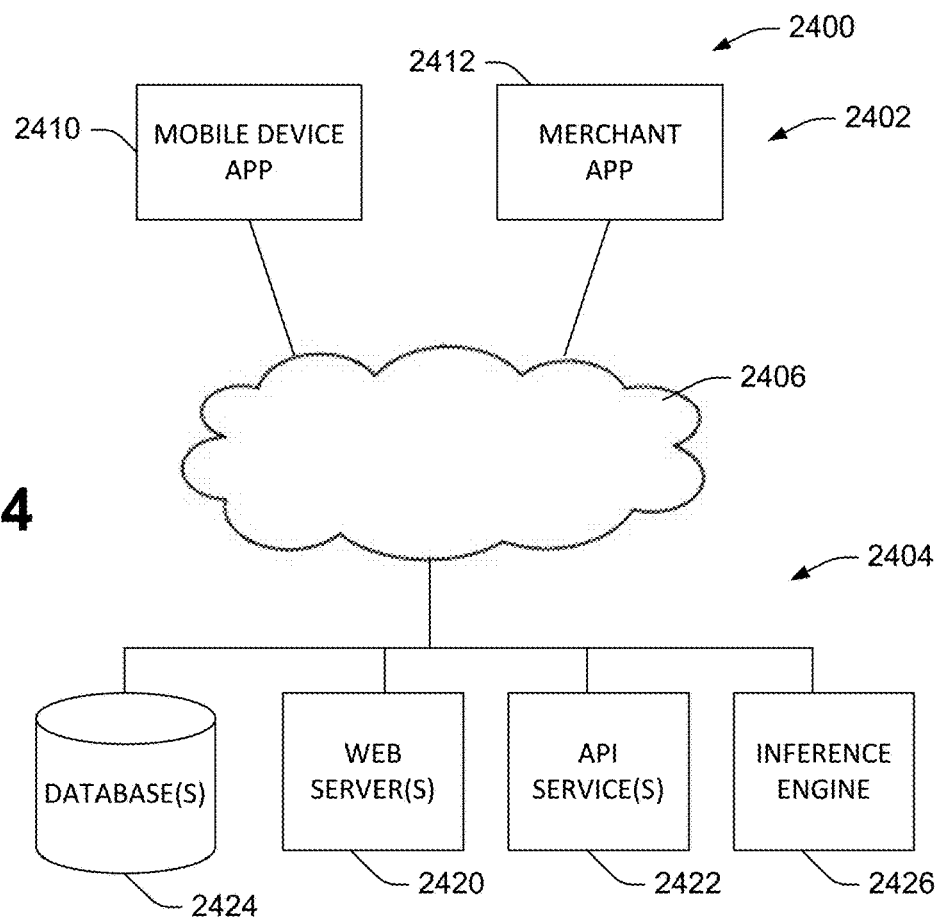
FIG. 24 is a block diagram depicting aspects of system for providing a customer or potential customer an incentive to leave one merchant's location and go to another merchant's establishment in accordance with some embodiments of the present invention.

FIG. 24 illustrates an example of a system 2400 configured to implement certain methods disclosed herein, such as the method illustrated in FIG. 23. At a very basic level, the system 2400 includes a front-end 2402, a back-end 2404, and a communication interface 2406 such as the internet. Examples of the front-end 2402 include a graphical user interface application granted to a user. A front-end application accesses and manipulates data in the back-end 2404. In the illustrated embodiment, the front-end 2402 includes a mobile device application 2410, such as an iPhone® or Android® app running on the mobile device 102, and a web based merchant portal front-end application 2412 operating on any suitable device capable of communicating with the internet 2406. The illustrated back-end 2404 includes server-based applications, services, and persistence layers that are deployed to dedicated hardware systems or cloud based environments, for example. Thus, example implementations of the back-end 2404 include one or more web servers 2420 that include appropriately programmed processing devices, API services 2422 and memory devices 2424 including databases, program code, etc. In some embodiments, the back-end 2404 further includes an inference engine 2426 that receives input components such as a user identification and location, and based thereon, provides outputs to the front-end 2402 as discussed further herein.

FIGS. 25-29 are examples of certain screens displayed by an embodiment of the mobile device application 2410. For ease of discussion, FIGS. 25-29 will be presented in terms of a scenario where a restaurant owner (the enticing merchant) has identified a competing restaurant (Merchant1) and defined a geographic area that includes the competing restaurant and/or an area associated with the competing restaurant, such as a parking area commonly used by customers of the competing restaurant and input the boundaries defining the geographic area into the system 2400 using the merchant web application 2412. The boundaries input into the merchant web application 2412 are received by the back-end 2404 via the internet 2406 and stored in the database 2424 (operation 2300 of FIG. 23). When it is determined that the mobile device running the mobile application 2410 is located in the first geographic area—i.e. near the Merchant1 restaurant (operation 2304 of FIG. 23), the back-end 2404 receives an alert and in response thereto, an alert message is sent to the mobile device 102. In some embodiments, the system 2400 further determines whether the mobile device 102 has come to rest within the first geographic area for at least some predetermined time period. In such implementations, the inference engine 2426, for example, could be configured so as to infer that the customer has arrived in a parking lot of the competitor's restaurant if the mobile device 102 comes to rest within the first geographic area for at least some predefined time period.

Figure 25:
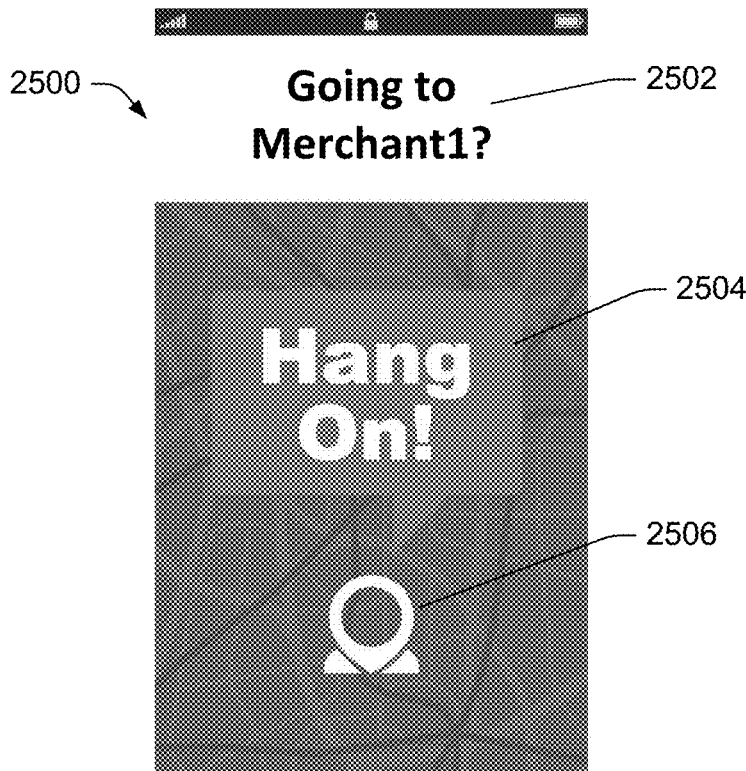
FIG. 25 depicts an alert screen in accordance with some embodiments of the present invention.

FIG. 25 illustrates an example of an alert screen 2500. The messages displayed in the alert screen 2500 can be input via the merchant web application 2412, or in some embodiments, are boilerplate messages. In the illustrated alert screen, an alert message includes two parts: "Going to Merchant1?" is displayed in a first message area 2502, along with "Hang On!" in a second message area 2504. In some versions, one or more of the messages displayed are displayed in sequence, and/or animated. For instance, in some embodiments, the message displayed in the second message area 2504 is animated, such that the "Hang On" message moves across the display to its illustrated position to give the effect of the illustrated icon 2506 shouting "Hang On!" In other embodiments, notifications, such as push notifications or local notifications, and/or other types of alert messages are provided. For example, in place of, or in addition to the alert screen 2500, alerts such as an icon displayed in the device's notification area, vibration, sounds, etc. are used alone or in combination with one another. Still further, the alert screen 2500 could be displayed following such alerts with or without further inputs from the user.

After displaying the alert screen 2500, an incentive message is sent to the mobile device 102. In some implementations, user input is received via the alert screen 2500 by displaying an input device such as a "continue" or "accept," input button, a drop down button, etc., and in response to the input the incentive message is displayed on the mobile device 102. In other embodiments, the incentive message is displayed following display of the alert message 2500 for some predetermined time period, or following some other criteria. In still further embodiments, and alternative input device is displayed wherein the user could choose not to view the incentive message (i.e. a "decline" button).

Figure 26:
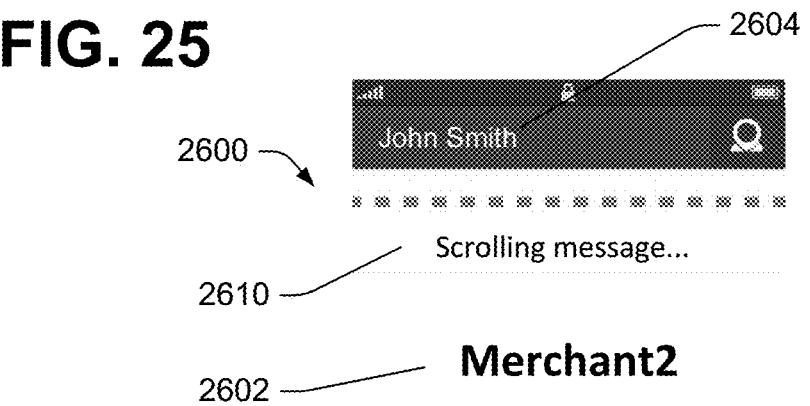
FIG. 26 depicts an incentive screen in accordance with some embodiments of the present invention.
Figure 26:
Figure 26:

FIG. 26 illustrates an example incentive message 2600. The example incentive message 2600 identifies the establishment located at the second geographic location (Merchant2, i.e., the enticing merchant), and typically displays a logo or other identification of Merchant2 in a merchant identification area 2602. The user "John Smith" is shown in a user identification area 2604, and the particular incentive is displayed in an incentive area 2606. On the illustrated incentive screen 2600, the incentive is a "50% off any purchase" offer. Of course other types of incentives could be offered, such as fixed discounts off a minimum purchase ("$5 off purchase of $20 or more), buy-one-get-one-free, free or discounted kid's meal with purchase of adult meal, etc. In some embodiments, the displayed incentive 2606 is time limited as shown in the incentive limitation display area 2608, thus enticing the customer to immediately leave the Merchant1 establishment and go to the Merchant2 establishment before the incentive 2606 expires. Some embodiments include a headline message 2610, which in the illustrated screen 2600 is a scrolling message. Example information messages inform customers of new menu items, other specials, etc. Some headline messages 2610 are intended to be humorous or even controversial ("Our new wings are better than Merchant1's wings!") in order to capture the customer's attention. Headline messages are determined by Merchant2, such as by use of the screens depicted in FIGS. 30A-30E discussed herein below.

Some versions of the incentive screen 2600 include a "get directions" input 2612, which in response to activation by a user display a map and/or directions to the Merchant2 establishment using the GPS interface on the mobile device 102, for example. The illustrated incentive screen 2600 further incudes a "share" button 2614 that allows the user to share the incentive with others, such as friends or followers. In some implementations, the user is encouraged to share incentive offers by rewarding the user for such sharing. For example, according to embodiments, users receive further discounts to the Merchant2 establishment or other commercial establishments, or even payment for sharing incentives (e.g. $1 for each share).

Figure 27:
FIG. 27 depicts a second alert screen in accordance with some embodiments of the present invention.

If the customer in possession of the mobile device 102 decides to leave the Merchant1 location and go to the Merchant2 establishment, a second alert message is sent and displayed on the mobile device 102 when the system 2400 determines that the mobile device 102 is located within a second geographic area in proximity to and/or including the second commercial location (location of Merchant2). FIG. 27 illustrates an example second alert screen 2700 displayed in some embodiments in response to the mobile device 102 entering the second geographical area. Upon entering the second geographical region, the second alert 2700 is sent to the mobile device 102, including a second alert message 2702 notifying the customer that they've arrived at the Merchant2 establishment, and they can redeem their voucher for the incentive 2606 offered on the screen 2600 shown in FIG. 26. If the user would like to redeem the voucher, an input control may be provided such as clicking the alert message 2702. In other embodiments, additional inputs are provided such as a "decline" input.

Figure 28:
FIG. 28 depicts a welcome screen in accordance with some embodiments of the present invention.

In response to user input, or after a predetermined time period, a voucher for the incentive 2606 is sent to the mobile device 102. In certain embodiments, a welcome message such as that illustrated in FIG. 28 is first sent to the mobile device 102 and displayed thereon. The welcome screen 2800 includes a welcome message 2802 that provides a download input 2804 that the customer can use to download the voucher for the offer 2606. Some embodiments include further inputs, such as a decline input. Upon activation of the download input 2804, the voucher is sent to the mobile device 102.

Figure 29:
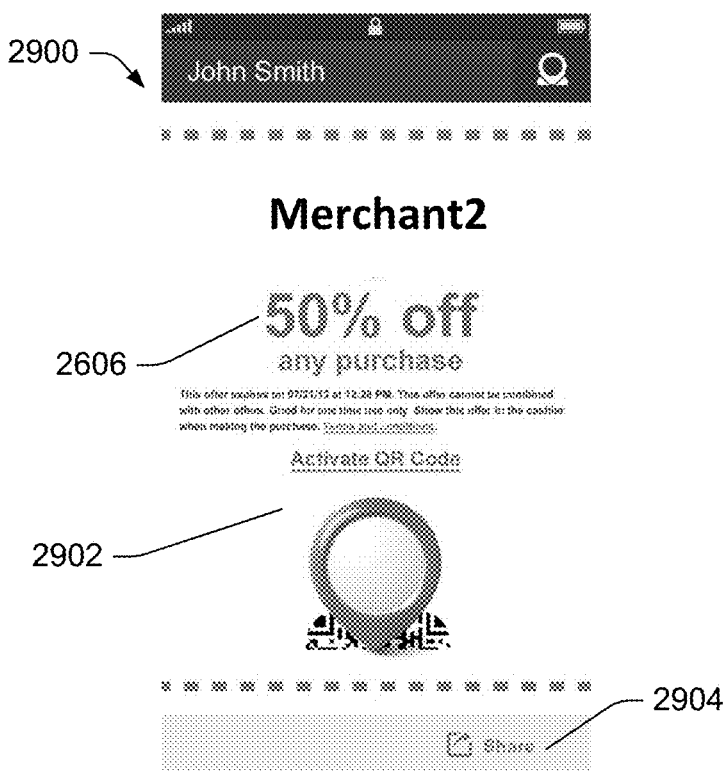
FIG. 29 depicts a voucher screen in accordance with some embodiments of the present invention.

FIG. 29 shows an example of a voucher screen 2900. The example voucher screen 2900 displayed on the mobile device 102 displays the incentive 2606, which can be shown by the customer in the Merchant2 establishment to receive the incentive. Some embodiments further include a validation device such as a control number, a bar code, a two-dimensional bar code (i.e. QR code), etc. In the voucher screen 2900 shown in FIG. 29, a validation device 2902 includes a link to activate a bar code, such as a QR code. In some implementations, the provision of the validation device allows establishing a "closed loop" incentive system, in which the enticing merchant, Merchant2, can validate that the incentive 2606 was used by a customer. For example, in some embodiments the QR code provided in the validation device 2902 is linked to the Merchant2 point-of-service (POS) system, so that when the QR code is scanned a record or notification of the incentive redemption is created in the POS system. Alternatively, the enticing merchant could be notified by a record in the POS system, an email, etc. of instances where the validation device 2902 is activated, or if the download input 2804 of the welcome screen is activated, for example.

In some implementations, compensation schemes are provided in which the enticing merchant compensates a party implementing the system 2400 and thus providing the desired incentives to customers or potential customers. For example, the system provider can be compensated for one or more of the various actions described herein in conjunction with FIGS. 25-29, such as when the customer is detected leaving the Merchant1 location, when the customer is detected arriving at the Merchant2 location, when the download input 2804 of FIG. 28 is activated to download an incentive voucher, when the QR code is activated via the validation input 2902 of FIG. 29, when the QR code is scanned by the enticing merchant, etc. Still further, the compensation amount can be varied for different incentive actions. For instance, a $1 compensation could be earned by the system provider for verifying the customer leaving the Merchant1 location and/or arriving at the Merchant2 location, and a $2 compensation could be earned for the customer activating the QR code using the verification screen 2900.

Referring again to FIG. 29, in some embodiments, following the activation of the validation device 2902, the incentive offer is valid only for some predetermined time period. Upon activating the validation device 2902, various expiration notification notifications (count-down timer, expiration date/time, etc.) could be displayed, for example. In further embodiments, the displayed QR code or other validation device disappears following some predetermined time period following activation of the validation device 2902.

In certain embodiments, further validation devices are provided. For example, the bar code, QR code, validation number, etc. displayed on the validation screen 2900 is animated (i.e. moves back and forth across the display) in some implementations, thus preventing use of a captured static image of the screen 2900.

Similarly to the incentive screen 2600 shown in FIG. 26, a share 2904 button is provided on the validation screen 2900 so that the customer in possession of the mobile device 102 can share the voucher with friends or followers, for example. Moreover, the share button 2904 can be configured so that the customer can associate the voucher 2900 with the Merchant2 location in accordance with embodiments of the locational messaging system disclosed herein above. Referring back to FIG. 1, if the Merchant2 location is location L1, the voucher could be the digital content that is associated with the location L1 so that another user could later encounter the voucher.

As noted above, the definition of the first geographic area (the region including the Merchant1 location) as received in operation 2300 of FIG. 23 is provided using the merchant application 2412 shown in FIG. 24. In some embodiments, the enticing merchant enters this information using the merchant application 2412 implemented as a web application of the front-end 2402. In certain implementations, this and other information is entered into the merchant application 2412 by creating a "campaign."

Figure 30A:
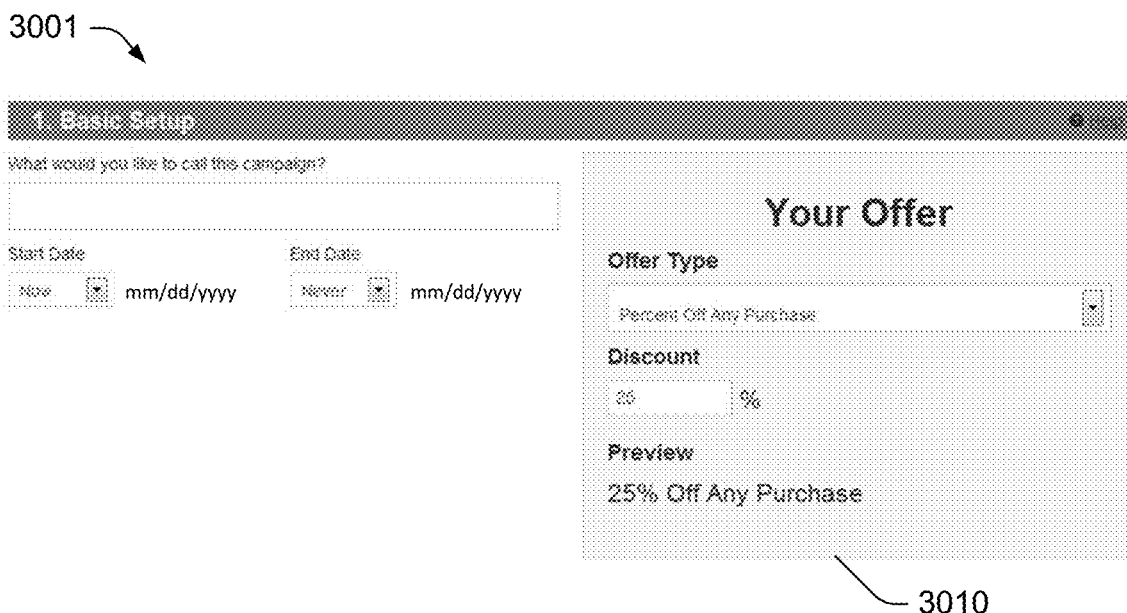
FIGS. 30A-30E depict a series of campaign creation screens in accordance with some embodiments of the present invention.

FIGS. 30A-30E are example screens illustrating portions of an example campaign creation process from an embodiment of the merchant application 2412. FIG. 30A shows an example of a basic setup screen 3001, in which the enticing merchant names the campaign, establishes start and end dates of the campaign if desired, and defines the offer at an offer input section 3010. The incentive offer entered in section 3010 is displayed on the various mobile device screens, including the incentive screen 2600, the welcome screen 2800 and the voucher screen 2900. As noted above, various incentives could be offered, such as a percent off any purchase, fixed discounts off a minimum purchase ("$5 off purchase of $20 or more), buy-one-get-one-free, free or discounted kid's meal with purchase of adult meal, etc.

Figure 30B:
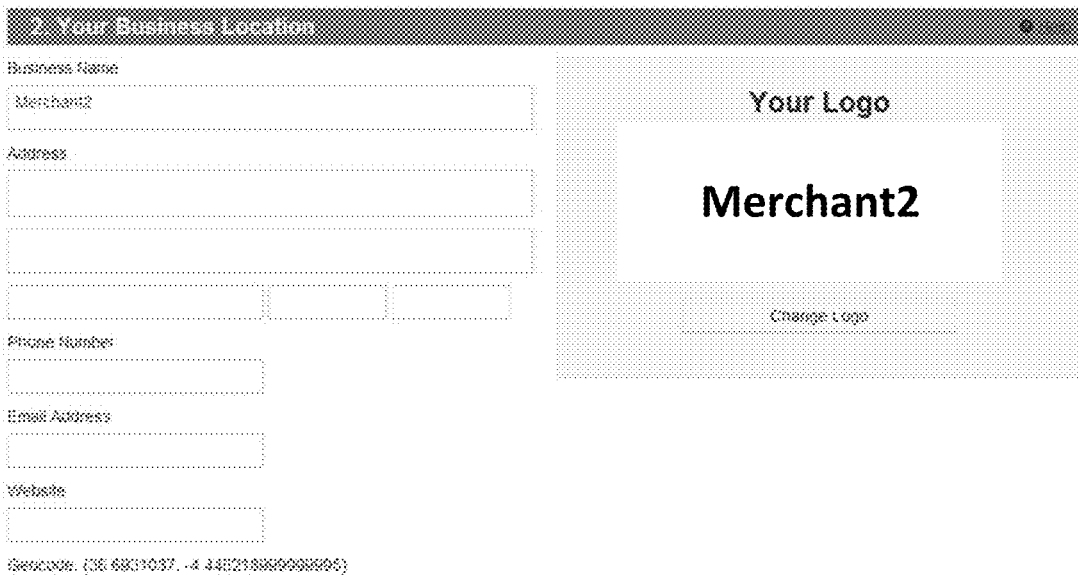

A second setup screen 3002 is shown in FIG. 30B, wherein the enticing merchant enters further information regarding the Merchant2 establishment, such as the business name, address, phone, email, website, etc. The Merchant2 logo can also be provided for display on the various mobile device screens such as those illustrated in FIGS. 25-29.

Figure 30C:
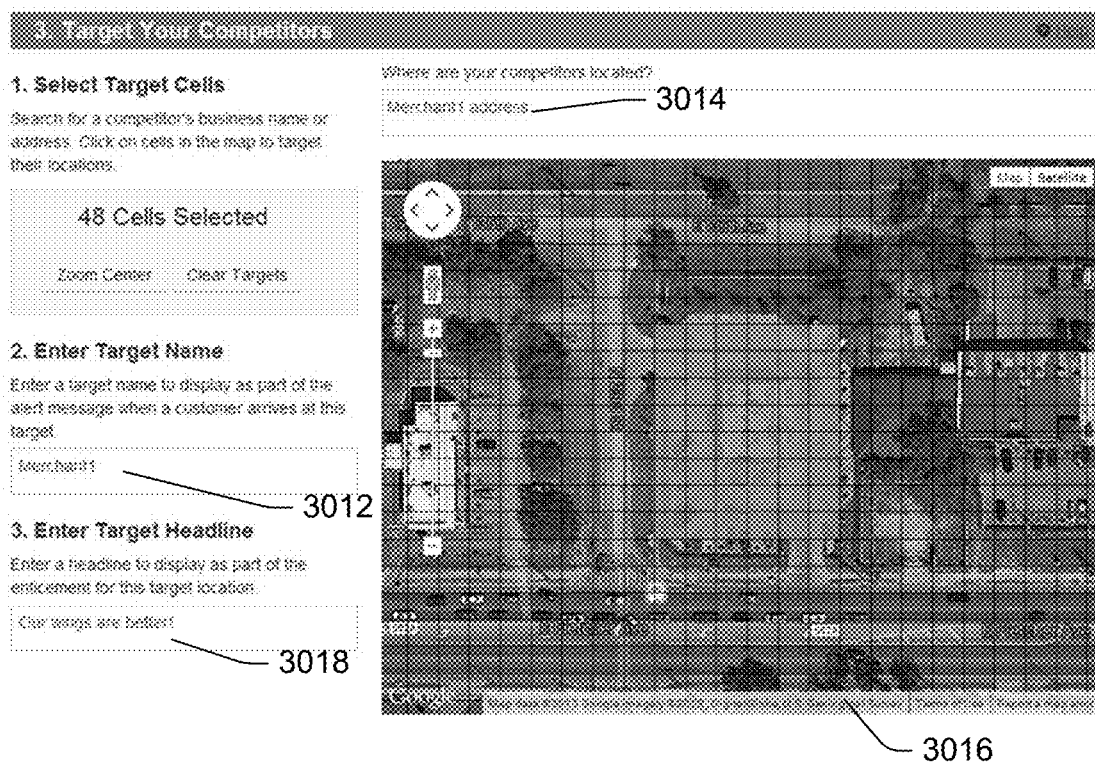

FIG. 30C illustrates a third setup screen 3003, in which information about the target establishment is received. The enticing merchant enters information regarding the target establishment, Merchant1, that is displayed in the mobile device screens shown in FIGS. 25-29. The target name 3012 and address 3014 are entered. In the example described in conjunction with FIGS. 25-29, the target is a competing business. However, this is not always the case. For example, the target establishment could alternatively be a complementary business, such as a movie theater, in which case a restaurant owner could attempt to entice movie theater patrons to visit the Merchant2 restaurant following a movie showing.

Moreover, in some implementations, it is possible for more than one enticing merchants to establish campaigns targeting the same target establishment or the same or overlapping geographic areas. For example, the owners of two different restaurants could each target the same movie theater, the same competing restaurant or the same or overlapping geographic areas, such as the same parking lot or the same or overlapping areas of a parking lot. Several solutions to such situations exist, such as auctioning the target to the highest bidder, "time sharing" (in response to detection of a user within a target area, a first voucher for a first enticing merchant is displayed during a first time period and a second voucher for a second enticing merchant is displayed during a second time period, meaning that a first merchant would pay the system provider for the first time period and the second merchant would pay the system provider for the second time period), "slotting" (in response to detection of a user within a target area, a first voucher for a first enticing merchant is displayed to 60% of customers and a second voucher for a second enticing merchant is displayed 40% of customers, meaning that the first merchant would pay the system provider a fee for the right to have its enticement displayed in response to 60% of the instances in which customers enter the target area, and a second merchant would pay the system provider a fee for the right to have its enticement displayed in response to 40% of the instances in which customers enter the target area). Other schemes are possible. Still further, an enticing merchant may "defensively" target his or her own establishment. In other words, if Merchant2 defines a target area including its own establishment or an area associated with its establishment (such as a parking area commonly used by its customers), other merchants could potentially be prevented from targeting the Merchant2 establishment, or, according to other embodiments, in the event that other merchants defined a target area overlapping with Merchant2's defensive targeting of its own establishment and/or areas associated therewith, the conflict may be resolved by the aforementioned auction, slotting or timesharing schemes. Thus, a merchant may defensively block enticements from being delivered to its own customers either entirely, or during time periods, or to an extent determined by the slotting fee paid by Merchant2.

A map 3016 of a geographical region including the Merchant1 address is displayed, and the user can zoom in or out to the desired resolution. In the illustrated embodiment, the geographic area is defined and received (operation 2300 of FIG. 23) by the application 2412 using the map 3016. When the map 3016 is at the desired resolution, a grid is superimposed over the map 3016, and the user selects squares, or cells, on the map to define the first geographic area that includes the Merchant1 location. Typically, cells corresponding to the Merchant1 address and surrounding area, such as the parking lot associated with the Merchant1 establishment, are selected. In the illustrated screen 3003, 48 cells have been selected to define the first geographic area associated with the Merchant1 location. The example screen 3003 further includes an input area 3018 in which the user can input a target headline for display. The headline 3018 corresponds to the headline message 2610 displayed on the incentive message screen 2600 shown in FIG. 26.

Figure 30D:
Figure 30D:
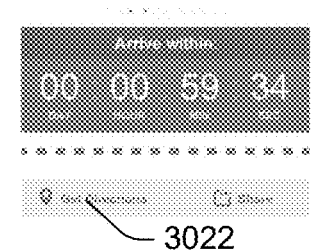

FIG. 30D illustrates an example of an enticement creation screen. If desired, a time limit for the offered incentive defined on the screen 3001 is entered at an input area 3020. A preview 3022 of the incentive message screen 2600 (shown in FIG. 26) that includes the time limit entered in the input area 3020, as well as the Merchant2 logo provided on the screen 3002 and the headline message input using the input area 3018 of the screen 3003 is provided on the enticement creation screen 3004.

Figure 30E:
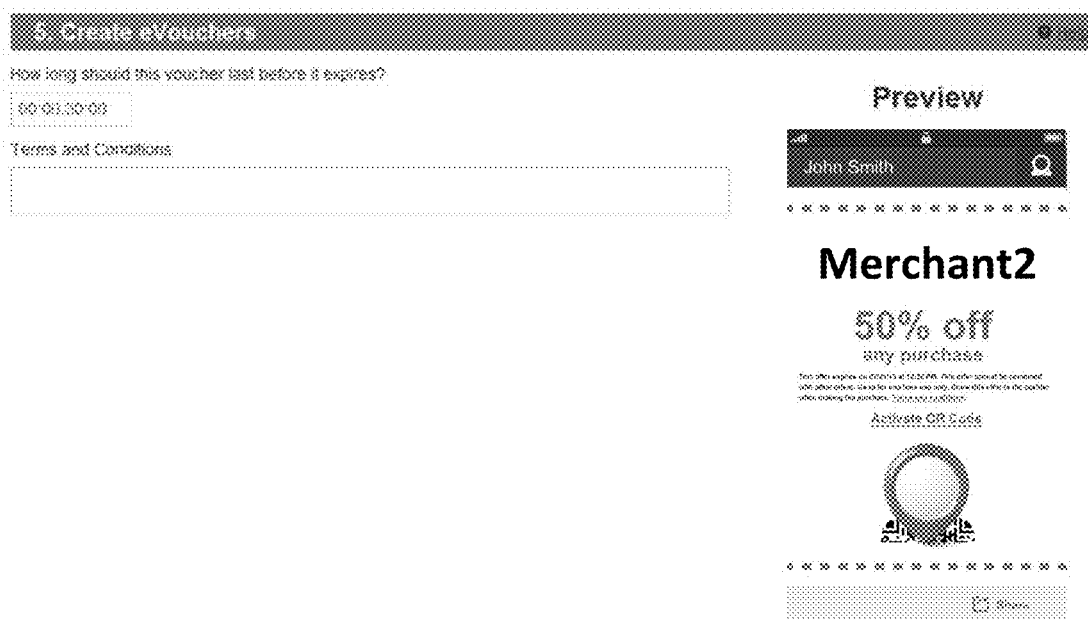

In FIG. 30E, an example of a voucher creation screen 3005 is shown in which the voucher screen 2900 is created. If desired, the voucher time limit is entered in an input area 3030, and additional terms and conditions of the offered incentive can be entered at an input area 3032. A preview 3034 of the voucher screen 2900 (shown in FIG. 29) is provided on the voucher creation screen 3005.

In some implementations, the campaign creation process is not necessarily implemented immediately following completion of the example input screens shown in FIGS. 30A-30E. For example, the information entered is manually or automatically verified before implementing the campaign to insure someone actually associated with the enticing merchant created the campaign. Other embodiments are envisioned wherein the validation process is automated, such as checking information input during the campaign against information available from other sources such as the better business bureau, Secretary of State, banking institutions, etc.

Figure 31:
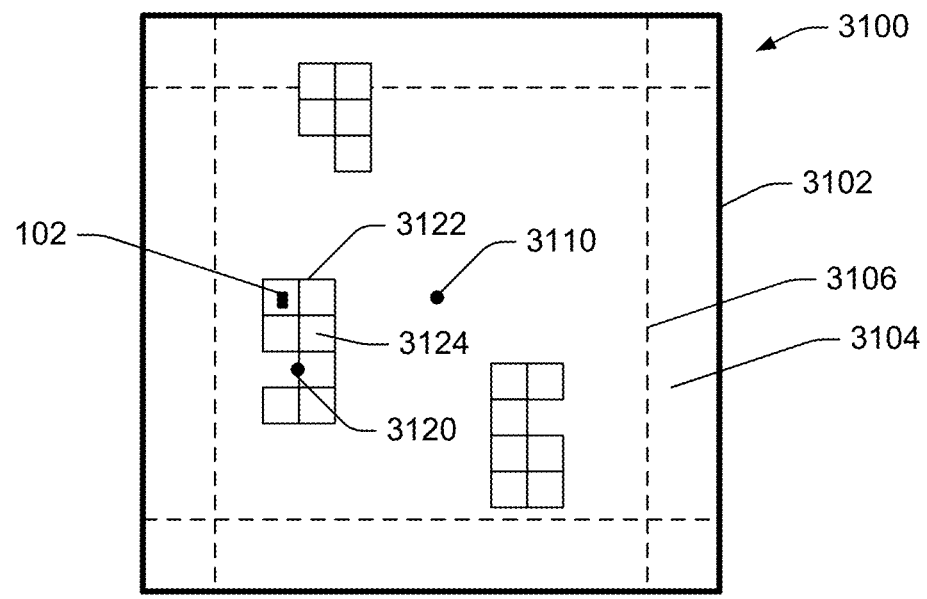
FIG. 31 depicts an example of a defined first geographic region in accordance with some embodiments of the present invention.

As noted above in conjunction with the discussion of FIG. 30C, the first geographic area including the first commercial location (the Merchant2 location) is defined during the campaign creation process using input screens such as the examples illustrated in FIGS. 30A-30E. In some embodiments, a "region" is defined using data received during the campaign creation process by the back-end 2404, as well as information downloaded by the front-end. FIG. 31 conceptually illustrates an example of a region 3100 and various aspects thereof. The illustrated region 3100 includes various pieces of information and sub-elements such as the boundary extents 3102 of the region 3100, a "warning track" 3104 defined by a warning track boundary 3106, a region center point 3110 and one or more targets discussed further below.

The boundary extents 3104 include coordinates that define the bounds of the region object 3100. The warning track 3104 is a region situated about the periphery of the region 3100 between the warning track inner boundary 3104 and the region boundary 3102. One or more targets (such as the Merchant1 commercial location 3120) reside within the bounds 3102 of the region 3100. The target 3120 is surrounded by a geographic target area 3120 that has a footprint that is made up of one or more "rings" 3124. The target rings 3124 are a collection of polygons, or "rings", that define the full bounds of the target area 3122. In the illustrated embodiment, each ring 3124 is a square defined by (x,y) bounds, though other geometries could be used in alternative embodiments. The size of the ring (square) 3124 can be determined, for example, based on usability within the campaign creation process when selecting targets and/or GPS resolution factors using the grid displayed on the map 3016 of the input screen 3003 illustrated in FIG. 30C.

In operation 2302 of FIG. 23, the location of the mobile device 102 is determined. In some embodiments, the mobile device application 2410 monitors the location of the mobile device 102 and reports the location to the back-end 2404. If the application 2410 detects that the mobile device 102, and thus the user has crossed into a target area 3122 and is at rest, it will send a message to the back-end 2404. In certain embodiments, to be considered "at rest," the mobile device must cease moving for some predetermined time period, such as one minute or more. The back-end 2404 will then determine if the user should receive an enticement notification. If the inference engine 2426 determines that an enticement is applicable, the user will receive, for example, a push notification or other message describing the enticement associated with the target area 3122 such as the alert screen 2500 and subsequent screens disclosed in FIGS. 25-29.

Figure 32:
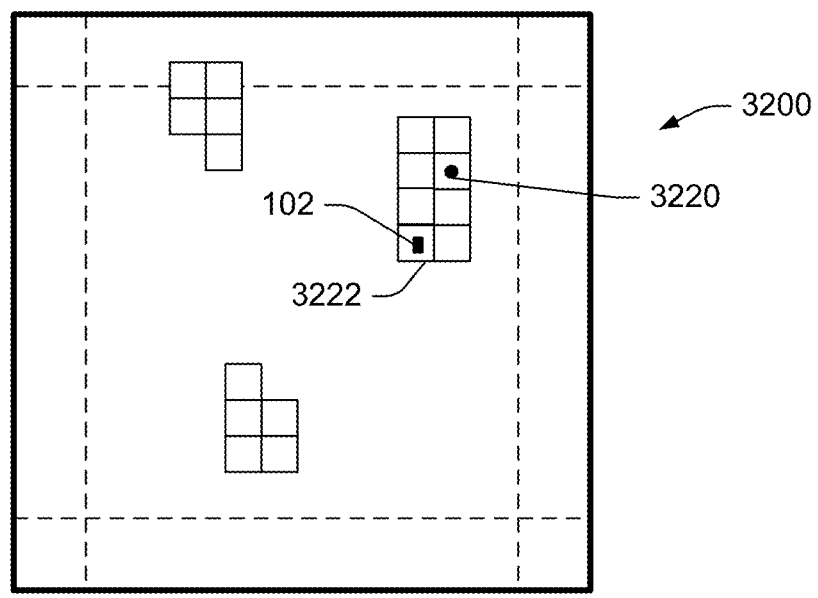
FIG. 32 depicts an example of a defined second geographic region in accordance with some embodiments of the present invention.

After a user has accepted and downloaded an enticement, for example, by selecting the appropriate input on the example alert screen 2500, the mobile device 102 will begin to monitor the its movement, watching for the user to become at rest within the enticing merchant location—the Merchant2 location. FIG. 32 illustrates another region 3200 in which the second geographic area 3222 including the Merchant2 location 3220 is located. If the mobile application 2410 determines the mobile device 102 at rest in the Merchant2 geographic region 3222, the mobile device 102 sends a message indicating this event to the back-end 2404. The back-end 2404 responds, for example, by sending a push notification containing the applicable voucher welcome screen 2700.

In accordance with further aspects of the disclosure, in some embodiments an activity log is kept throughout the day to track the various locations of the mobile device 102 and thus, the user's movement. This information, for example, could be routinely uploaded to the back-end 2404 periodically such as once per day. Examples of the activity log include a flat table of time stamps and GPS coordinates. Other dimensions could further be included, such as accelerometer tilt/pan/skew, power on/power off events, hibernate wake/sleep events, call initiations, texts sent, user gestures, contacts, phone history, email, messaging, social network data, etc. to refine and improve the inference engine 2426. In some implementations, the log is compressed before uploading and is only uploaded if the mobile device 102 has a WIFI connection. The log can be cleared from the mobile device 102 by the device application 2410, for example, if the server 2420 has confirmed the log has been uploaded and stored in the database 2424.

An example of daily system operations could thus include activities initiated in response to a daily event time. Upon the mobile application 2410 detecting a new daily event time has been crossed, for example 4:00 AM, the mobile application 2410 clears it's local cache of region objects and performs a daily target request (DTR). A base region object (for example, region 3100 shown in FIG. 31) is derived on the back-end 2404 based on a user identification associated with the mobile device 102 and/or mobile application 2410, location, campaign data, etc. The base region is downloaded to the front-end 2402 through a set of services 2422, and the region object is cached locally on the mobile device 102 and is not be cleared until the next daily event.

As the day progresses, the user moves within the base region 3100 boundary 3102. The user typically would stop and become "at rest" at several points throughout the day. Enticement and voucher events are raised throughout the day if the user becomes at rest within a geographic area defined during a campaign (such as the first geographic area 3122), and calls to the back-end 2404 are performed as defined herein above in response thereto. An activity log is uploaded at the end of the day, or potentially at various times in the day when WIFI is available.

A daily target request (DTR) could include, for example, sending a user identification of the mobile device 102 and the location (latitude, longitude) thereof as determined using its GPS transceiver 336 (see FIG. 3) to the back-end 2404. In response thereto, the server 2420 sends an appropriate base region object, which contains a collection of targets (such as the Merchant1 location 3120 and associated geographic area 3122) and a warning track 3104 identification.

Figure 33:
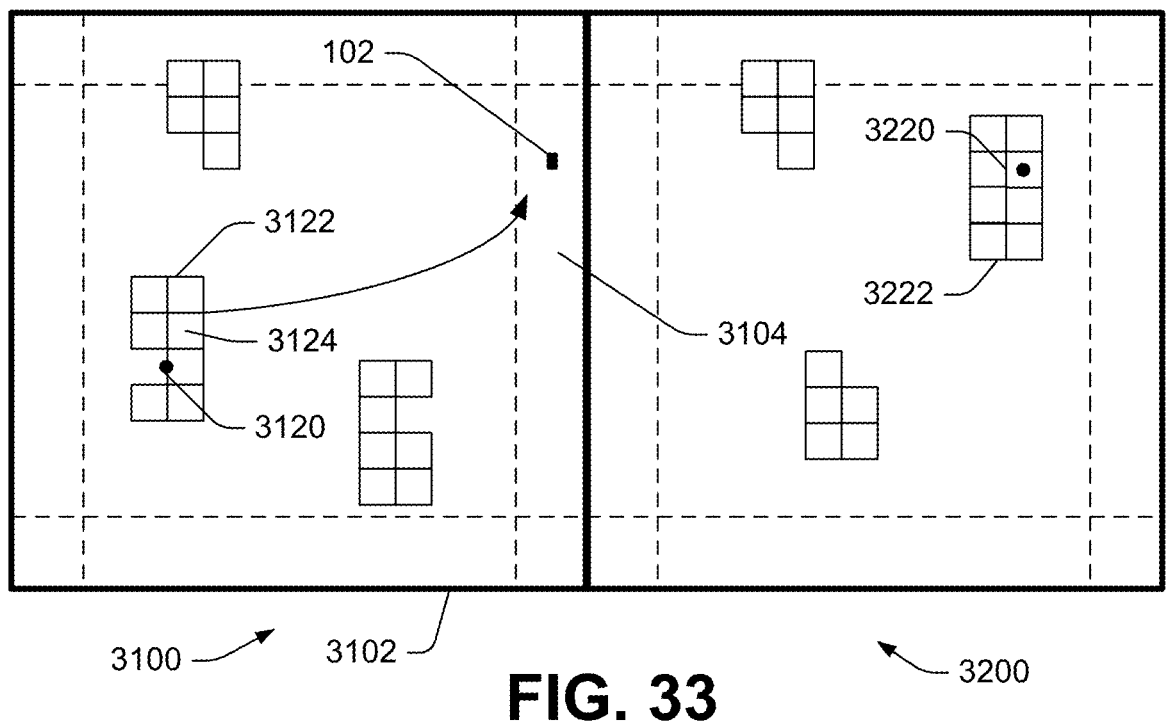
FIG. 33 depicts an arrangement the first and second geographic regions illustrated in FIGS. 31 and 32, respectively, situated adjacent one another in accordance with some embodiments of the present invention.
Figure 34:
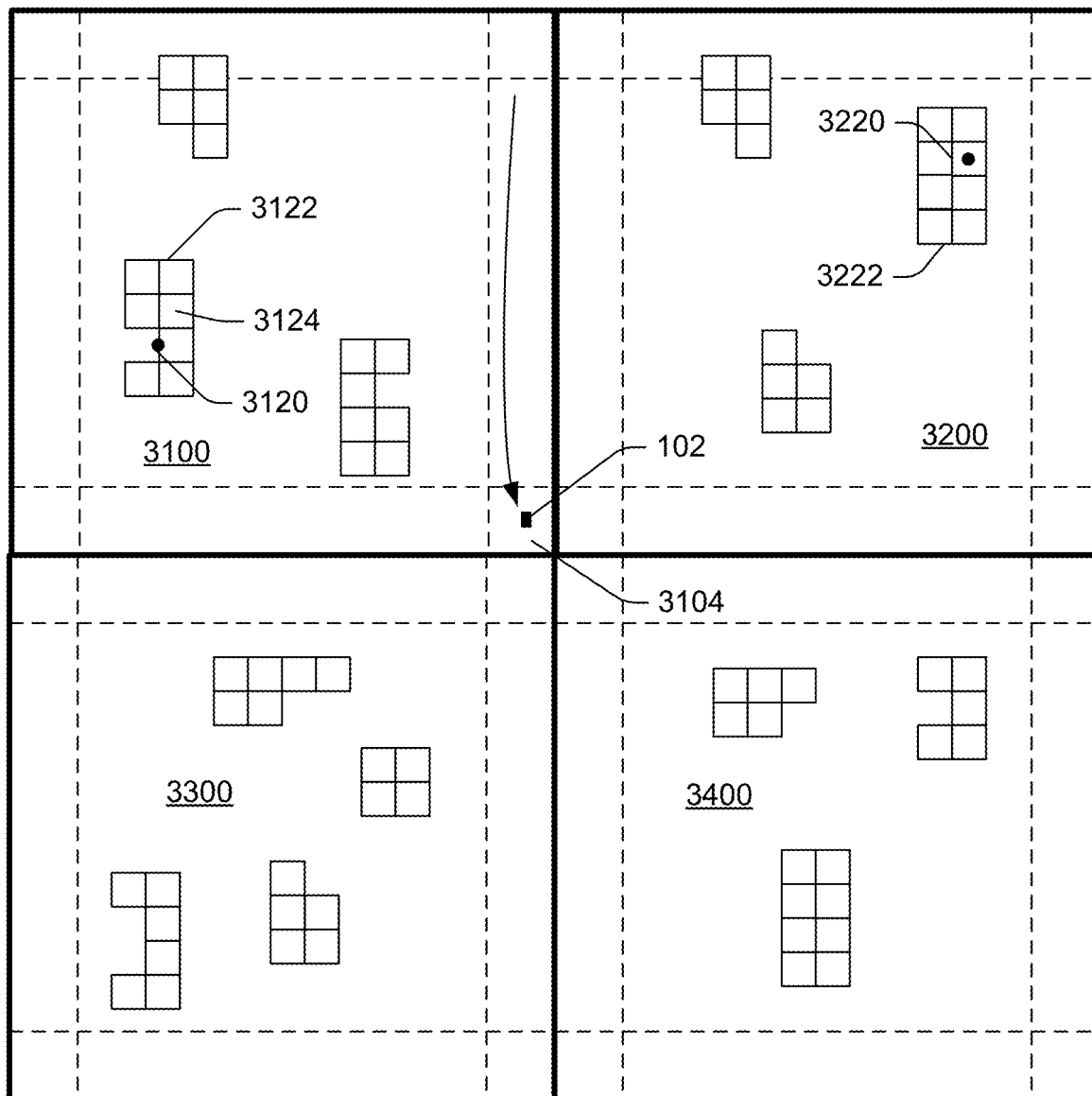
FIG. 34 depicts an arrangement of the first and second geographic regions illustrated in FIG. 33 with third and fourth geographic regions in accordance with some embodiments of the present invention.

FIG. 33 shows regions 3100 and 3200 adjacent to one another. If the mobile device 104 moves from the location shown in FIG. 31 (the Merchant1 area 3122) into the warning track area 3104, the mobile device 102 sends a Real-Time Target Request (RTTR) to the back-end 2404. In some examples, the RTTR is functionally similar to the DTR, except the cache is not cleared. As the mobile device 102 crosses into various warning track regions such as the warning track 3104, adjacent regions (such as the region 3200) are loaded and cached locally on the mobile device 102. FIG. 34 illustrates a situation where the mobile device 102 becomes at rest in a corner of the region 3100 in the warning track 3104. In response thereto, the mobile device 102 requests three regions 3200, 3300, 3400 from the server 2420 with boundary extents adjacent to the currently active region 3100.

Following the initial DTR, the mobile device 102 builds up an increasing stack or collection of region objects and caches them as the mobile device 102 moves through space. In certain specific implementations, if a user crosses back and forth between regions, the request is not resent, and the cached regions are only cleared on DTR events.

As noted above, in addition to determining the location of the mobile device 102 at a particular location, example embodiments further require determining that the mobile device 102 is at rest before it makes the request and loads a new region. For example, if the user is riding on a train with the mobile device 102, it does not make sense to fill up cache space with regions that will never be used. Once the mobile device 102 comes to rest at the end of the train ride, however, a new region could be loaded. Moreover, the cache could be completely cleared and a new DTR sent in response to such a scenario—if the mobile device 102 and thus the user suddenly appear in a location far from their starting region (for example just off a plane), a new DTR should be performed.

The various embodiments described above are provided by way of illustration only and should not be construed to limit the invention. Those skilled in the art will readily recognize various modifications and changes that may be made to the present invention without following the exemplary embodiments and applications illustrated and described herein, and without departing from the true spirit and scope of the present invention, which is set forth in the various claims.

The claimed invention is:

1. A computerized method of providing a customer incentive to leave a first commercial location and to arrive at a second commercial location, the method comprising:
   displaying a map including the first commercial location and the second commercial location;
   displaying a grid including a plurality of cells on the map;
   receiving a definition of a first geographic area including the first commercial location and a second geographic area including the second commercial location including a selection of cells of the grid;
   receiving a location of a mobile device in the possession of the customer;
   if the mobile device is determined to have come to rest at a location within the first geographic area that includes the first commercial location for a first predetermined time period, then sending a first alert message to the mobile device;
   receiving an input on the first alert message;
   in response to receiving the input on the first alert message, sending an incentive message to the mobile device for the customer to leave the location and go to the second commercial location;
   and
   if after sending the incentive message, the mobile device is determined to be at a location within the second geographic area within a second predetermined time period, then sending to the mobile device a voucher for a merchant located at the second commercial location.

2. The method of claim 1, further comprising:
   sending a second alert message to the mobile device;
   and
   sending the voucher to the mobile device in response to an input on the second alert message.

3. The method of claim 1, further comprising:
   displaying a bar code representing the voucher on the mobile device.

4. The method of claim 1, wherein determining the location of the mobile device includes receiving an indication of the location of the mobile device from the mobile device.

5. The method of claim 4, further comprising:
   defining a first geographic region object that includes the first geographic area; and
   sending the geographic region object to the mobile device in response to the mobile device entering the first geographic region.

* * * * *